United States Patent
Hasegawa et al.

(10) Patent No.: US 8,270,902 B2
(45) Date of Patent: Sep. 18, 2012

(54) COMMUNICATION SYSTEM AND RECEIVER USED IN COMMUNICATION SYSTEM

(75) Inventors: Kazuo Hasegawa, Gunma-ken (JP); Hirohisa Suzuki, Gunma-ken (JP); Satoru Miyoshi, Isesaki (JP); Kazuya Kogure, Kiriu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 496 days.

(21) Appl. No.: 12/484,745

(22) Filed: Jun. 15, 2009

(65) Prior Publication Data
US 2009/0325485 A1   Dec. 31, 2009

(30) Foreign Application Priority Data

Jun. 13, 2008   (JP) ................. 2008-155012

(51) Int. Cl.
*H04B 5/00* (2006.01)
*H04B 7/00* (2006.01)
*H04M 1/00* (2006.01)
(52) U.S. Cl. ............ 455/41.1; 455/41.2; 455/575.6
(58) Field of Classification Search ............ 455/39, 455/40, 41.1, 41.2, 66.1, 575.6, 100, 344
See application file for complete search history.

(56) References Cited

U.S. PATENT DOCUMENTS

| | | | | |
|---|---|---|---|---|
| 5,796,827 | A * | 8/1998 | Coppersmith et al. | 713/182 |
| 6,879,809 | B1 * | 4/2005 | Vega et al. | 455/41.1 |
| 7,922,084 | B2 * | 4/2011 | Ishibashi et al. | 235/382 |
| 2006/0052056 | A1 * | 3/2006 | Park et al. | 455/41.1 |
| 2006/0217064 | A1 * | 9/2006 | Glass et al. | 455/41.1 |
| 2006/0252371 | A1 * | 11/2006 | Yanagida | 455/41.1 |
| 2006/0258408 | A1 * | 11/2006 | Tuomela et al. | 455/569.1 |
| 2008/0261523 | A1 * | 10/2008 | Kubono et al. | 455/41.1 |
| 2009/0270032 | A1 * | 10/2009 | Kassayan | 455/41.1 |

OTHER PUBLICATIONS

"Personal Area Networks (PAN): Near-Field Intra-Body Communication", Thomas Guthrie Zimmerman, B.S., Humanities and Engineering Massachusetts Institute of Technology (1980).

* cited by examiner

*Primary Examiner* — Andrew Wendell
(74) *Attorney, Agent, or Firm* — Cantor Colburn LLP

(57) ABSTRACT

A communication system is provided comprising an environment-side electrode and a living body-side electrode sandwiching an insulating layer and electrically insulated from each other, a grounding electrode which is electrically connected to the environment-side electrode, and a reception amplifier which amplifies a potential difference between the environment-side electrode and the living body-side electrode, wherein the grounding electrode has a side surface section which extends along a vertical direction.

9 Claims, 27 Drawing Sheets

COMMUNICATION SYSTEM AND RECEIVER USED IN COMMUNICATION SYSTEM

CROSS-REFERENCE TO RELATED APPLICATIONS

The entire disclosure of Japanese Patent Application No. 2008-155012 including specification, claims, drawings, and abstract, is incorporated herein by reference.

BACKGROUND OF THE INVENTION

1. Field of the Invention

The present invention relates to a communication system for enabling communication through a human body or the like and a receiver used in the communication system.

2. Description of the Related Art

A communication device which communicates through tissue of a living body such as a human body is known. For example, a technique is known in which data can be exchanged by a user merely holding a hand over a receiver while a portable electronic device such as a portable phone on which a transmitter is mounted is placed in a pocket of clothing of the user, or while the portable electronic device is hung around the neck.

For example, as shown in FIGS. 22A and 22B, a transmitter 100 comprises an encoder 10, a transmission amplifier 12, an environment-side electrode 14, and a living body-side electrode 16, and a receiver 102 comprises a decoder 18, a reception amplifier 20, an environment-side electrode 22, and a living body-side electrode 24. The transmitter 100 is mounted on a portable electronic device or the like which is carried by the user. The receiver 102 is placed on a ticket barrier of a station, a vending machine, a shop, etc.

FIG. 23 shows a relationship between the transmitter 100, the receiver 102, and the human body or the like during the communication. FIG. 24 shows an equivalent circuit of the relationship.

The transmitter 100 capacitively couples with the receiver 102 through tissue of a living body such as human body or the like (hereinafter simply referred to as "human body or the like"). The environment-side electrode 14 of the transmitter 100 forms a capacitive coupling A with an external environmental ground potential, a capacitive coupling B with the human body or the like, and a capacitive coupling D with an external environment. Similarly, the environment-side electrode 22 of the receiver 102 forms a capacitive coupling H with the external environmental ground potential and a capacitive coupling G with the external environment. As described, the environment-side electrodes 14 and 22 are electrodes which form capacitive couplings with the external environment during the communication.

The living body-side electrode 16 of the transmitter 100 forms a capacitive coupling C with the human body or the like. The living body-side electrode 24 of the receiver 102 forms a capacitive coupling F with the human body or the like. Moreover, a capacitive coupling E is formed between the human body or the like and the external environment. As described, the living body-side electrodes 16 and 24 are electrodes which form capacitive couplings with the human body or the like during the communication.

The transmission amplifier 12 of the transmitter 100 receives information encoded by the encoder 10 and outputs as a potential difference between the environment-side electrode 14 and the living body-side electrode 16. When the transmitter 100 and the receiver 102 are electrically coupled through the human body or the like as described above, the potential difference between the environment-side electrode 14 and the living body-side electrode 16 of the transmitter 100 causes a change in a potential difference between the environment-side electrode 22 and the living-body side electrode 24 of the receiver 102. The reception amplifier 20 of the receiver 102 amplifies the potential difference between the environment-side electrode 22 and the living body-side electrode 24 and outputs the amplified signal. The output of the reception amplifier 20 is decoded by the decoder 18. In this manner, the communication is established.

For example, communication is enabled by a user who carries the transmitter 100 holding a hand over (or contacting with a hand) the living body-side electrode 24 of the receiver 102 placed on a ticket barrier of a station.

In the above-described communication device, as shown in FIG. 24, the output of the reception amplifier 20 is determined based on the relationships between the capacitive coupling F and the other capacitive couplings A-E and G-H. Therefore, for the communication, it is desirable that the capacitive couplings A-E and G-H are stable.

For example, if the capacitive coupling D between the environment-side electrode 14 of the transmitter 100 and the external environment fluctuates, the communication becomes unstable. However, the capacitive coupling D between the environment-side electrode 14 of the transmitter 100 and the external environment would change depending on how the user carries the transmitter 100 such as, for example, holding in the hand, placed in a pocket of clothing, placed in a bag, etc., which may result in unstable communication.

In addition, as shown in FIG. 25, a noise source such as a personal computer and a digital television may exist between the environment-side electrode 14 and the grounding point of the external environment, or between the environment-side electrode 22 and the grounding point of the external environment. FIG. 26 shows an equivalent circuit of the communication system when a noise source exists. When a noise source exists, the capacitive coupling D formed between the environment-side electrode 14 and the grounding point of the external environment and the capacitive coupling G formed between the environment-side electrode 22 and the grounding point of the external environment are affected, and a problem may be caused in which the communication between the transmitter 100 and the receiver 102 cannot be realized.

SUMMARY OF THE INVENTION

According to one aspect of the present invention, there is provided a communication system for enabling communication between a transmitter which is portable and a receiver which is fixed, using a capacitive coupling through a living body, wherein the receiver comprises an environment-side electrode and a living body-side electrode sandwiching an insulating layer and electrically insulated from each other, a grounding electrode which is electrically connected to the environment-side electrode, and a reception amplifier which amplifies at least a voltage of the living body-side electrode, and the grounding electrode has a side surface section which extends along a vertical direction.

BRIEF DESCRIPTION OF THE DRAWINGS

Preferred embodiments of the present invention will be described in detail based on the following drawings, wherein.

DESCRIPTION OF THE PREFERRED EMBODIMENTS

A communication system according to a preferred embodiment of the present invention comprises a transmitter 200 and a receiver 202. The transmitter 200 may be used incorporated in a portable electronic device such as a portable phone. The receiver 202 may be used placed in a ticket barrier of a station, a vending machine, a shop, etc.

Figure 1:
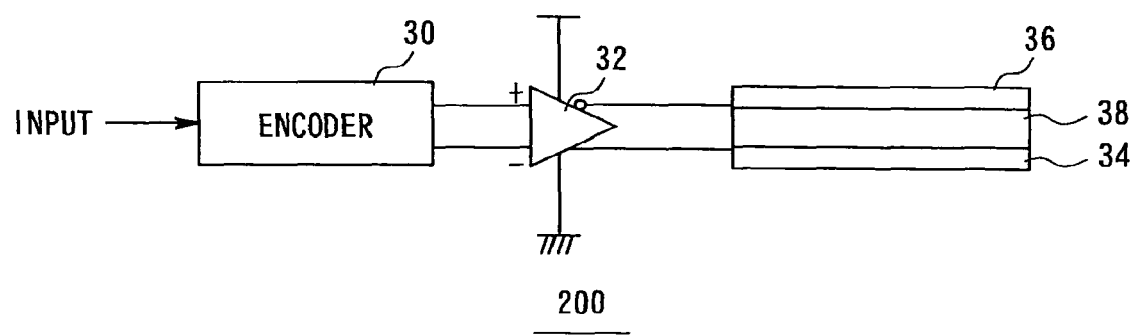
FIG. 1 is a diagram showing a structure of a transmitter of a communication system in a preferred embodiment of the present invention.

As shown in FIG. 1, the transmitter 200 comprises an encoder 30, a transmission amplifier 32, an environment-side electrode 34, and a living body-side electrode 36.

The encoder 30 encodes data which is input from the outside using a predetermined encoding method and outputs the encoded data to the transmission amplifier 32. The data which is input from the outside is input in a superposed state on a base wave of a high frequency. The frequency of the base wave is preferably set, for example, to 5 MHz or higher or 15 MHz or lower.

The transmission amplifier 32 comprises a differential amplifier circuit. An inverted input terminal (−) and a non-inverted input terminal (+) of the differential amplifier circuit are connected to an output terminal of the encoder 30, a non-inverted output terminal is connected to the environment-side electrode 34, and an inverted output terminal is connected to the living body-side electrode 36. The transmission amplifier 32 amplifies a signal which is input from the encoder 30 and differentially outputs to the environment-side electrode 34 and the living body-side electrode 36. A potential difference between the environment-side electrode 34 and the living body-side electrode 36 changes according to the output of the transmission amplifier 32.

The environment-side electrode 34 and the living body-side electrode 36 are each formed with a conductor. For example, these electrodes are formed with a conductor such as aluminum, stainless steel, etc. The environment-side electrode 34 and the living body-side electrode 36 are placed in an electrically insulated state from each other, sandwiching a dielectric layer 38.

Figure 2:
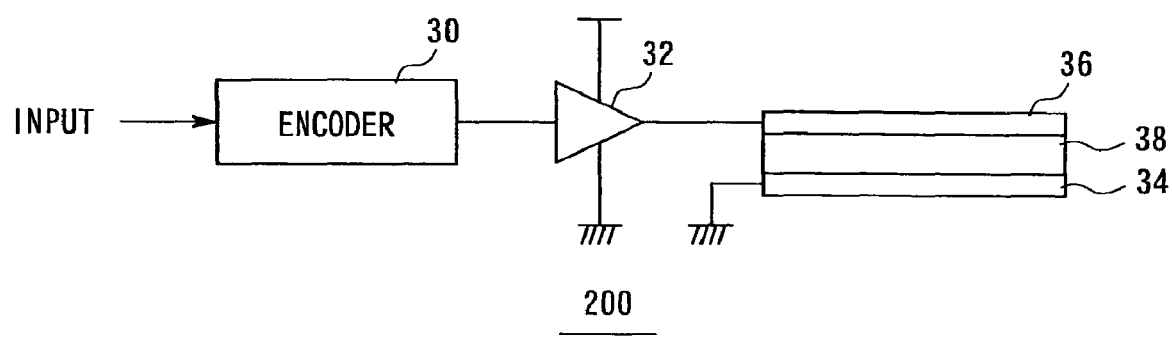
FIG. 2 is a diagram showing another structure of a transmitter of a communication system in a preferred embodiment of the present invention.

Alternatively, the transmitter 200 may be formed in a configuration as shown in FIG. 2. The transmission amplifier 32 includes a single amplifier circuit. An input terminal of the amplifier circuit is connected to an output terminal of the encoder 30, and an output terminal of the amplifier circuit is connected to the living body-side electrode 36. The environment-side electrode 34 is grounded. The transmission amplifier 32 amplifies a signal which is input from the encoder 30 and outputs the amplified signal to the living body-side electrode 36. A potential difference between the environment-side electrode 34 and the living body-side electrode 36 changes according to an output of the transmission amplifier 32.

Figure 3:
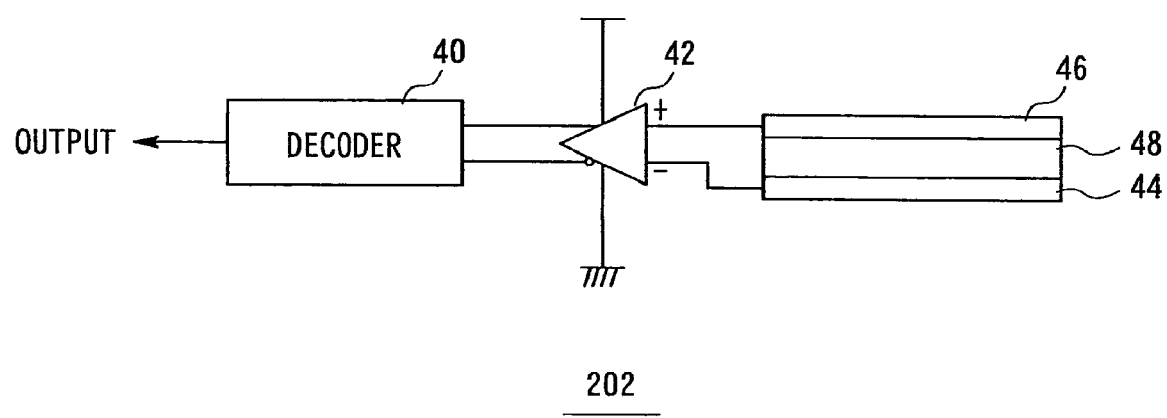
FIG. 3 is a diagram showing a structure of a receiver of a communication system in a preferred embodiment of the present invention.

As shown in FIG. 3, the receiver 202 comprises a decoder 40, a reception amplifier 42, an environment-side electrode 44, and a living body-side electrode 46.

The reception amplifier 42 comprises a differential amplifier circuit. An inverted input terminal (−) of the differential amplifier circuit is connected to the environment-side electrode 44, and a non-inverted input terminal (+) of the differential amplifier circuit is connected to the living body-side electrode 46. An inverted output terminal and a non-inverted output of the differential amplifier circuit are connected to an input terminal of the decoder 40. The reception amplifier 42 amplifies a potential difference between the environment-side electrode 44 and the living body-side electrode 46, and outputs as a potential difference between the inverted output terminal and the non-inverted output. The decoder 40 receives an output signal from the reception amplifier 42, decodes the signal with a decoding method corresponding to the encoding method used in the encoder 30, and outputs the decoded signal.

The environment-side electrode 44 and the living body-side electrode 46 are each formed with a conductor such as aluminum, stainless steel, etc. The environment-side electrode 44 and the living body-side electrode 46 are placed in an electrically insulated state from each other, sandwiching a dielectric layer 48.

Figure 4:
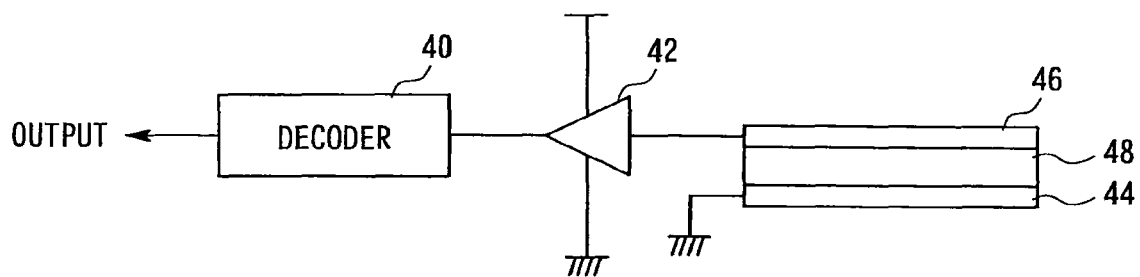
FIG. 4 is a diagram showing another structure of a receiver of a communication system in a preferred embodiment of the present invention.

Alternatively, the receiver 202 may be formed in a structure as shown in FIG. 4. The reception amplifier 42 comprises a single amplifier circuit. An input terminal of the amplifier circuit is connected to the living body-side electrode 465 and an output terminal of the amplifier circuit is connected to the decoder 40. The environment-side electrode 44 is grounded. The reception amplifier 42 amplifies a signal which is input from the living body-side electrode 46 and outputs the amplified signal to the decoder 40. The decoder 40 decodes the output of the reception amplifier 42 with a decoding method corresponding to the encoding method used in the encoder 30, and outputs the decoded signal.

The receiver 202 of the present embodiment further comprises a grounding electrode 50. The grounding electrode 50 is formed with a conductor. For example, the grounding electrode 50 is formed with a metal such as aluminum, stainless steel, etc. The grounding electrode 50 is grounded.

Figure 5:
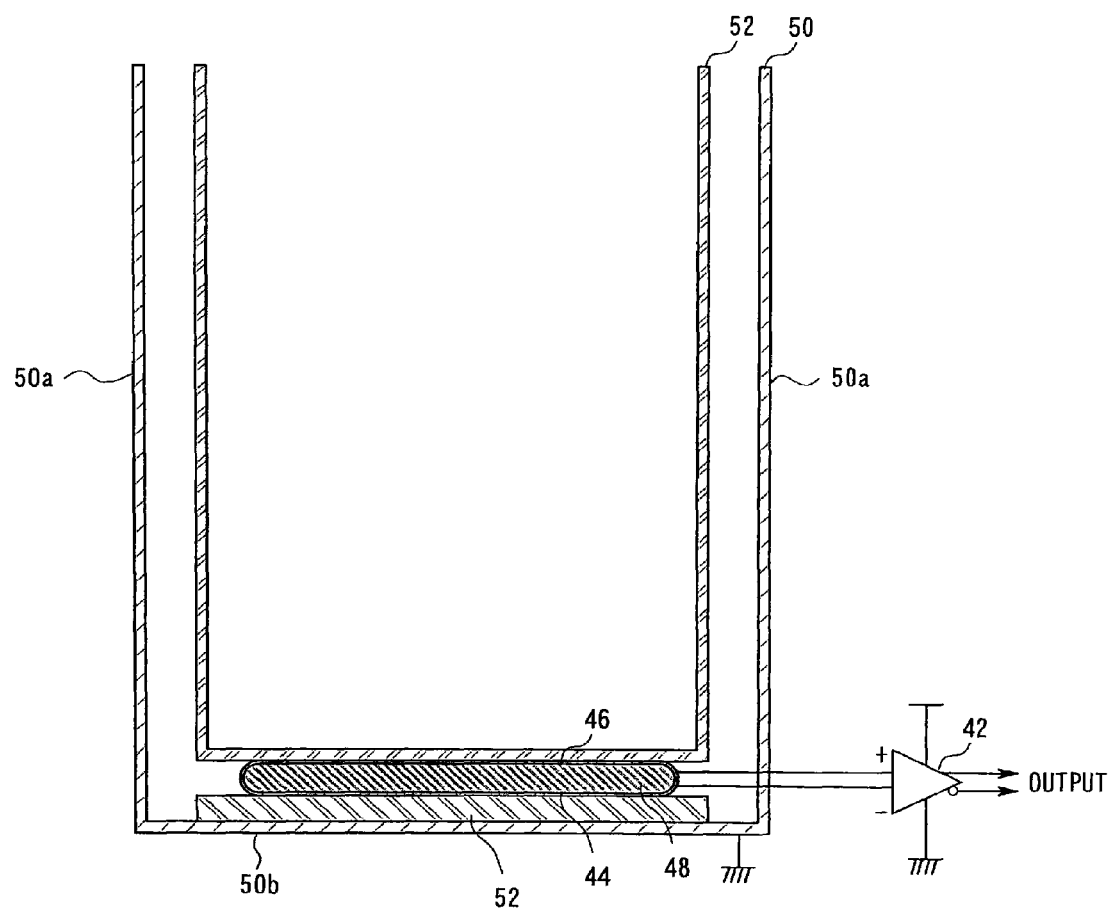
FIG. 5 is a diagram showing an example placement of a receiver in a preferred embodiment of the present invention.

For example, when the receiver 202 is placed on a gate such as a ticket barrier in a station, the environment-side electrode 44, living body-side electrode 46, and grounding electrode 50 are preferably placed in a manner shown in a cross sectional diagram of FIG. 5. FIG. 5 is a cross sectional diagram cutting the gate in a vertical direction with respect to the passageway direction (direction perpendicular to the paper surface of the drawing). In this example structure, the living body-side electrode 46 and the environment-side electrode 44 are placed below the floor of the passageway of the ticket barrier covered with an insulating member 52, with the living body-side electrode 46 at an upper position and the environment-side electrode 44 at a lower position. The dielectric layer 48 is sandwiched between the living body-side electrode 46 and the environment-side electrode 44. The grounding electrode 50 is provided along the passageway in the gate covered with the insulating member 52. The grounding electrode 50 comprises a side surface section 50a which extends in the vertical direction along a sidewall section of the passageway of the gate. In addition, the insulating member 52 may be provided below the living body-side electrode 46 and the environment-side electrode 44 and the grounding electrode 50 may be provided with a bottom surface section 50b extending also below the insulating member 52.

The extension in the vertical direction is not limited to a case where the grounding electrode 50 extends at an angle of exactly 90° with respect to the floor surface (ground surface), and the grounding electrode 50 may extend with a slope of an angle other than 90° with respect to the floor surface (ground surface). In addition, although the grounding electrode 50 preferably extends in the vertical direction continuously from the floor surface, it is not necessary that the grounding electrode 50 extend from the floor surface (ground surface). That is, it is only necessary that an extended portion is provided so that the grounding electrode 50 has a vertical direction component.

In such a structure of the communication system, when the user carrying the transmitter 200 passes through the passageway of the gate, a capacitive coupling D is formed between the receiver 202 placed below the floor and the body of the user, and communication is enabled between the transmitter 200 and the receiver 202.

Figure 6:
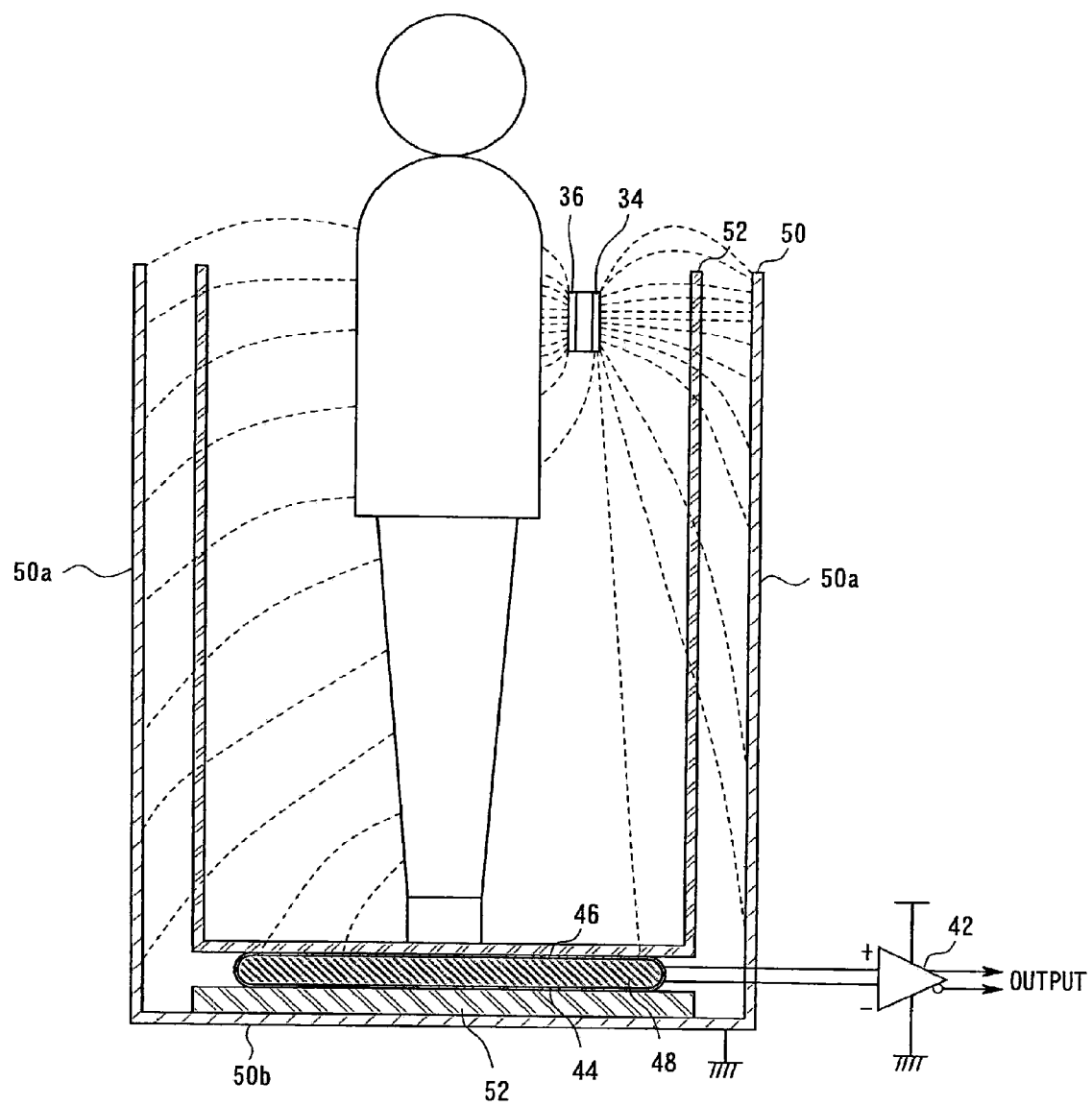
FIG. 6 is a diagram showing an example of formation of an electric field when a communication system is used in the example placement of FIG. 5.

For example, as shown in FIG. 6, when the user carrying the transmitter 200 passes through the gate, the living body-side electrode 36 of the transmitter 200 primarily forms a capacitive coupling C with the body of the user. The environment-side electrode 34 of the transmitter 200 primarily forms the capacitive coupling D with the grounding electrode 50. In other words, an electric flux line generated from the environment-side electrode 34 primarily ends at the grounding electrode 50. In addition, the living body-side electrode 46 of the receiver 202 primarily forms a capacitive coupling F with the foot (shoe bottom) of the user. That is, an electric flux line generated from the living body-side electrode 46 primarily ends at the foot (shoe bottom) of the user.

In a communication system of the related art where the grounding electrode 50 is not provided, the electric field generated between the environment-side electrode 34 of the transmitter 200 and the external environment spreads in various locations, and the capacitor of the capacitive coupling D when the user passes the gate is not stabilized because of the form and position of carriage by the user, such as the user holding the transmitter 200 in their hand, the transmitter 200 being placed in a pocket of clothing, the transmitter 200 being placed in a bag, etc. Therefore, when the distance between the human body or the like and the living body-side electrode 36 of the transmitter 200 is increased, a deficiency may be caused in the communication.

When, on the other hand, the grounding electrode 50 is placed to surround the side surface and bottom surface of the passageway of the gate as in the present invention, most of the electric field starting at the environment-side electrode 34 ends at the grounding electrode 50. Therefore, the capacitor of the capacitive coupling D formed between the environment-side electrode 34 of the transmitter 200 and the external environment when the user passes the gate is stabilized regardless of the form and position of the carriage, such as the user holding the transmitter 200 in their hand, the transmitter 200 being placed in the pocket of clothing, the transmitter 200 being placed in a bag, etc. As a result, the change in the electric field corresponding to the communication data which is output from the living body-side electrode 36 of the transmitter 200 can be reliably received by the receiver 202.

Figure 7:
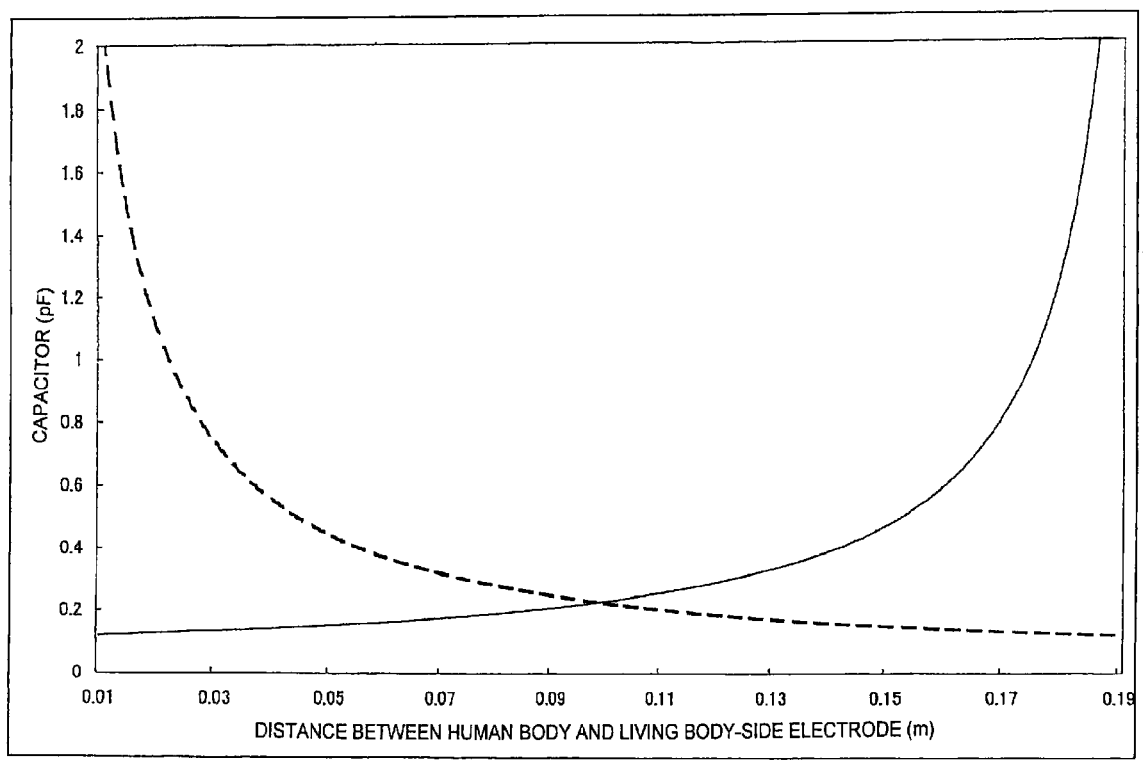
FIG. 7 is a diagram showing a relationship between a capacitive coupling C between a human body or the like and a living body-side electrode of a transmitter and a capacitive coupling D between an environment-side electrode of the transmitter and a grounding electrode in a preferred embodiment of the present invention.

For example, FIG. 7 shows, in a case where a width of the gate is set to 80 cm and a height of the side surface section 50a of the grounding electrode 50 is set to 100 cm, the capacitive coupling C (dashed line) between the human body or the like and the living body-side electrode 36 of the transmitter 200, and the capacitive coupling D (solid line) between the environment-side electrode 34 of the transmitter 200 and the grounding electrode 50, as a relationship with respect to a distance between the human body or the like and the living body-side electrode 36 of the transmitter 200. As shown in FIG. 7, as the distance between the human body or the like and the living body-side electrode 36 of the transmitter 200 is increased, the capacitive coupling C between the human body or the like and the living body-side electrode 36 of the transmitter 200 is reduced, but the capacitive coupling D between the environment-side electrode 34 of the transmitter 200 and the grounding electrode 50 is increased in a manner to compensate for the reduction.

Figure 8A:
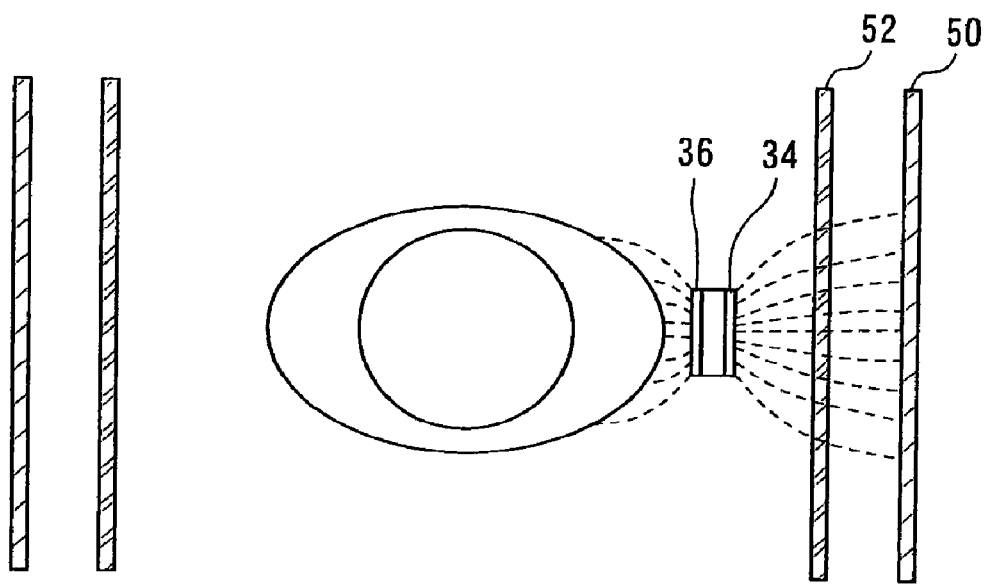
FIGS. 8A and 8B are diagrams showing an example of formation of an electric field when a communication system is used in an example placement of FIG. 5.
Figure 8B:
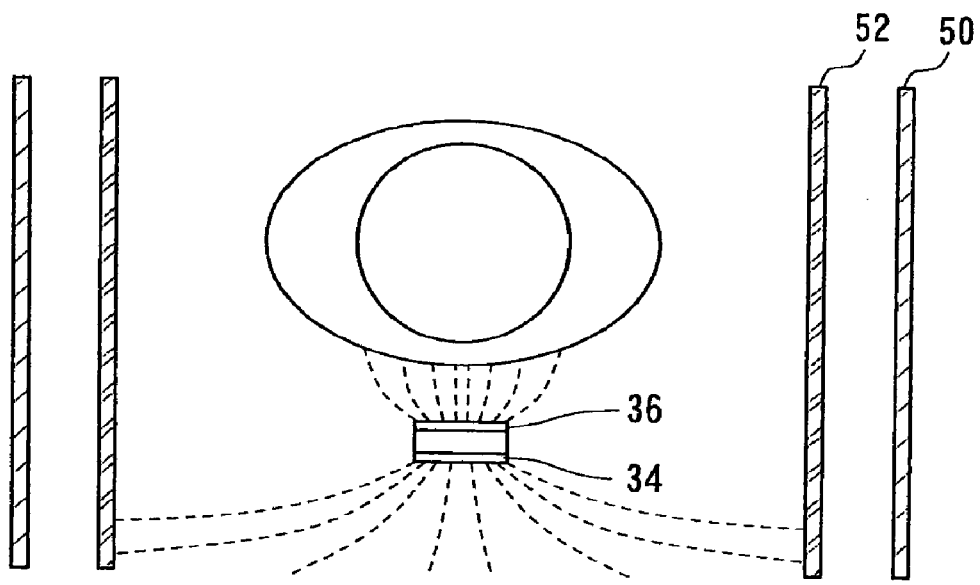

Moreover, as shown in FIGS. 8A and 8B, in addition to the case where the user carries the transmitter 200 alongside the body of the user (FIG. 8A), in the case where the user carries the transmitter 200 in front or in back of their body (FIG. 8B) also, the capacitive coupling D between the environment-side electrode 34 of the transmitter 200 and the grounding electrode 50 can be reliably formed. FIGS. 8A and 8B are diagrams viewing, from above, the gate on which the grounding electrode 50 is provided.

Figure 9:
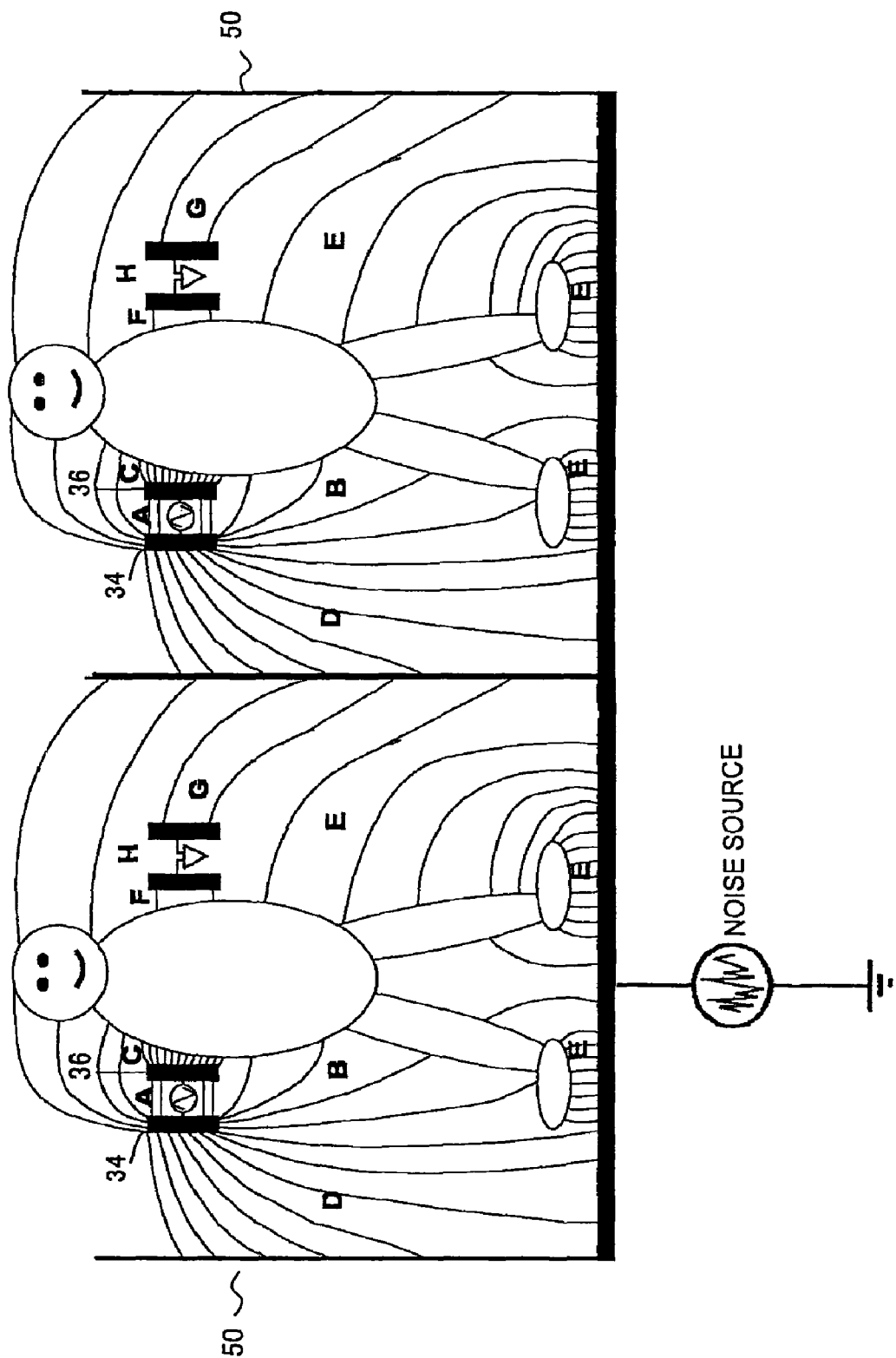
FIG. 9 is a diagram for explaining an electromagnetic shield in an example placement of a receiver in a preferred embodiment of the present invention.

In addition, as shown in FIG. 9, when the grounding electrode 50 is provided, the transmitter 200 carried by the user when the user passes through the gate and the receiver 202 are electromagnetically shielded with the grounding electrode 50. Therefore, the transmitter 200 and the receiver 202 do not tend to be affected by the external noise source. In addition, when a plurality of gates, each of which having the receiver 202, are placed as in a ticket barrier of a station, the mutual influences on the communication among the gates can be reduced.

Figure 10A:
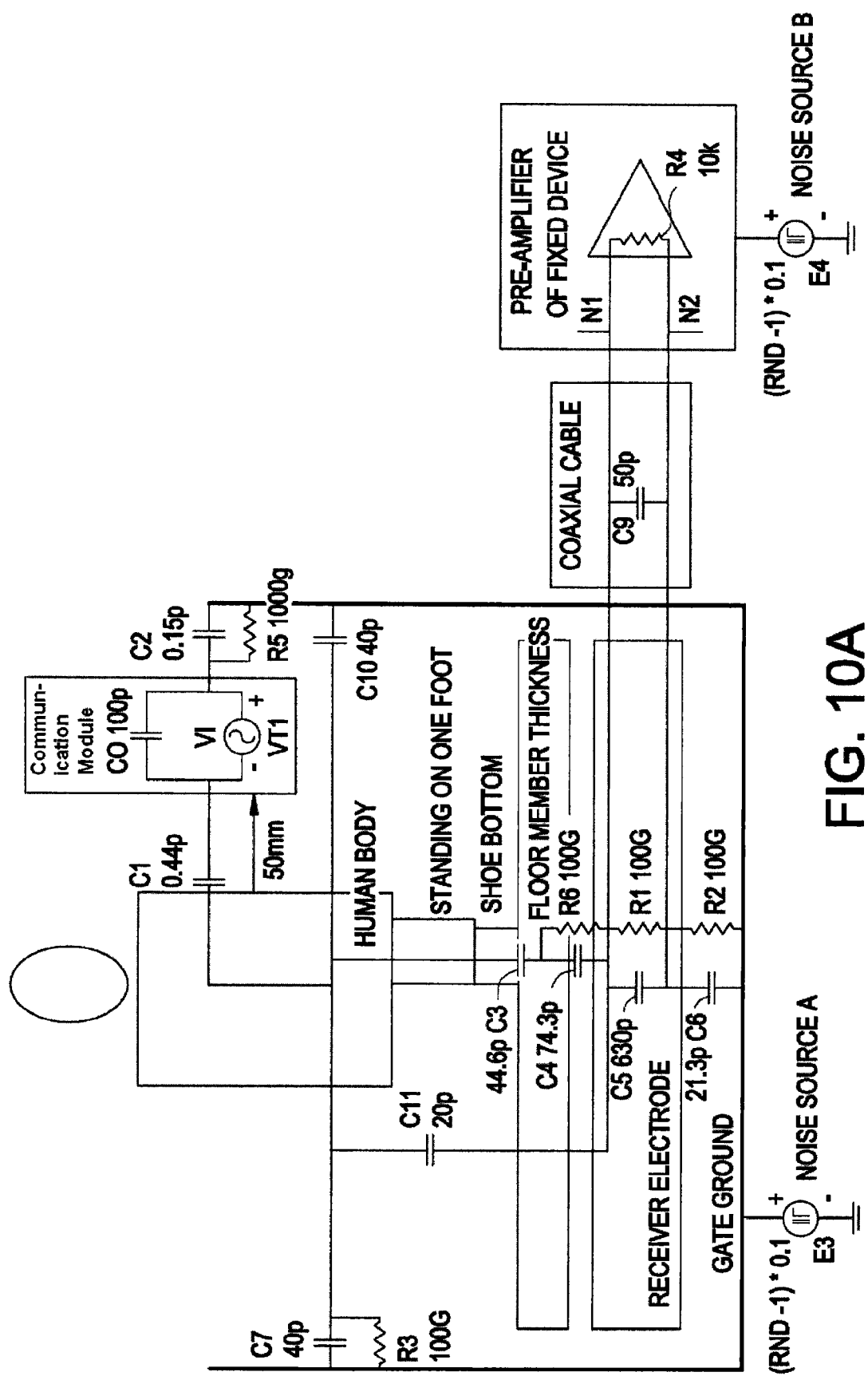
FIG. 10A is a diagram for explaining an effect of a noise source in a preferred embodiment of the present invention.
Figure 10B:
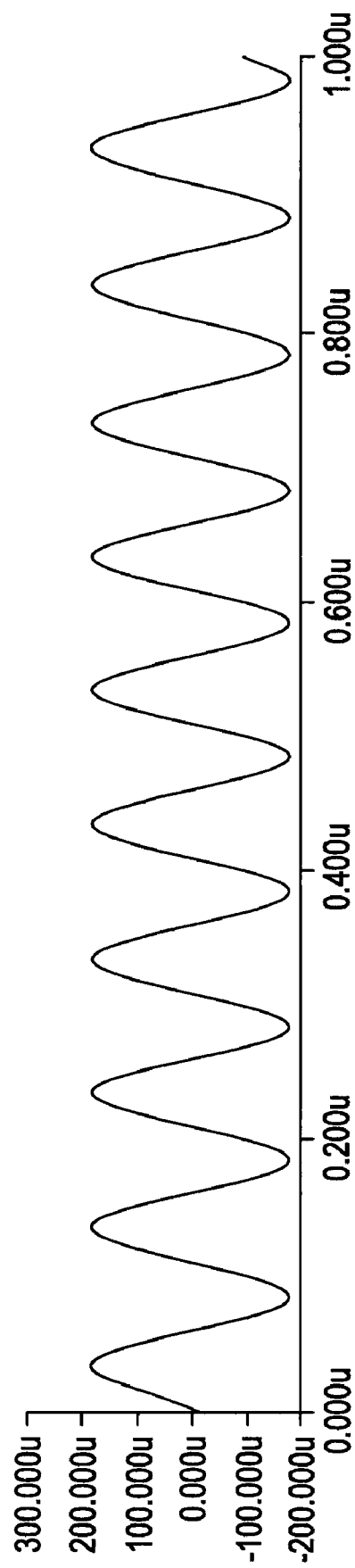
FIG. 10B is a diagram for explaining an effect of a noise source in a preferred embodiment of the present invention.

FIG. 10A shows an equivalent circuit when the reception amplifier 42 including the differential amplifier circuit is applied. As shown in FIG. 10A, a noise source A exists between the grounding electrode 50 and the grounding point and a noise source B exists between the grounding electrode of a circuit board on which the reception amplifier 42 is mounted and the grounding point. In such a case, the noise source A and the noise source B generate noises which differ from each other. FIG. 10B shows a potential difference between both input terminals of the reception amplifier 42 in the equivalent circuit of FIG. 10A. As shown in FIG. 10B, by applying a differential amplifier circuit in the reception amplifier 42, the communication signal can be amplified and output without being significantly affected by the noise source A and the noise source B.

In FIG. 10A, a configuration is shown where a pair of lines to the input terminal of the reception amplifier 42 is realized with one coaxial cable, but alternatively, a configuration may be employed in which separate coaxial cables are used for lines to the input terminal of the reception amplifier 42. In this case, it is preferable to connect the shield of each of the coaxial cables to the grounding electrode 50, to ground the shield. By connecting the shields of the coaxial cables to the grounding electrode 50, it is possible to reduce the influences of the noise source A and the noise source B compared to the structure where the shields of the coaxial cables are connected to the grounding electrode of the circuit board of the reception amplifier 42.

Figure 11:
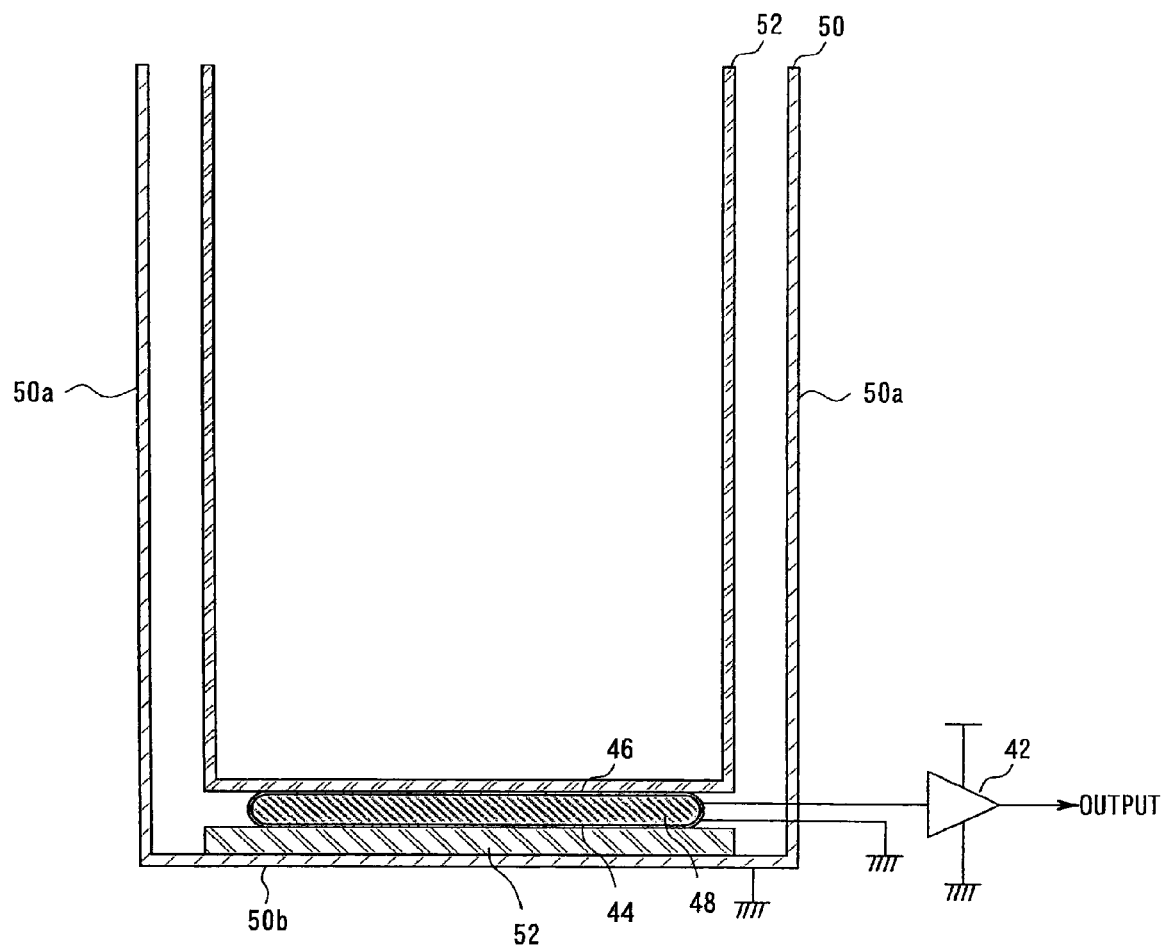
FIG. 11 is a diagram showing an example placement of a receiver in a preferred embodiment of the present invention.

FIG. 11 shows an example configuration in which the receiver 202 having the reception amplifier 24 with a single amplifier circuit is applied. With such a configuration also, advantages similar to those of the structure of the gate shown in FIG. 5 can be obtained.

Figure 12:
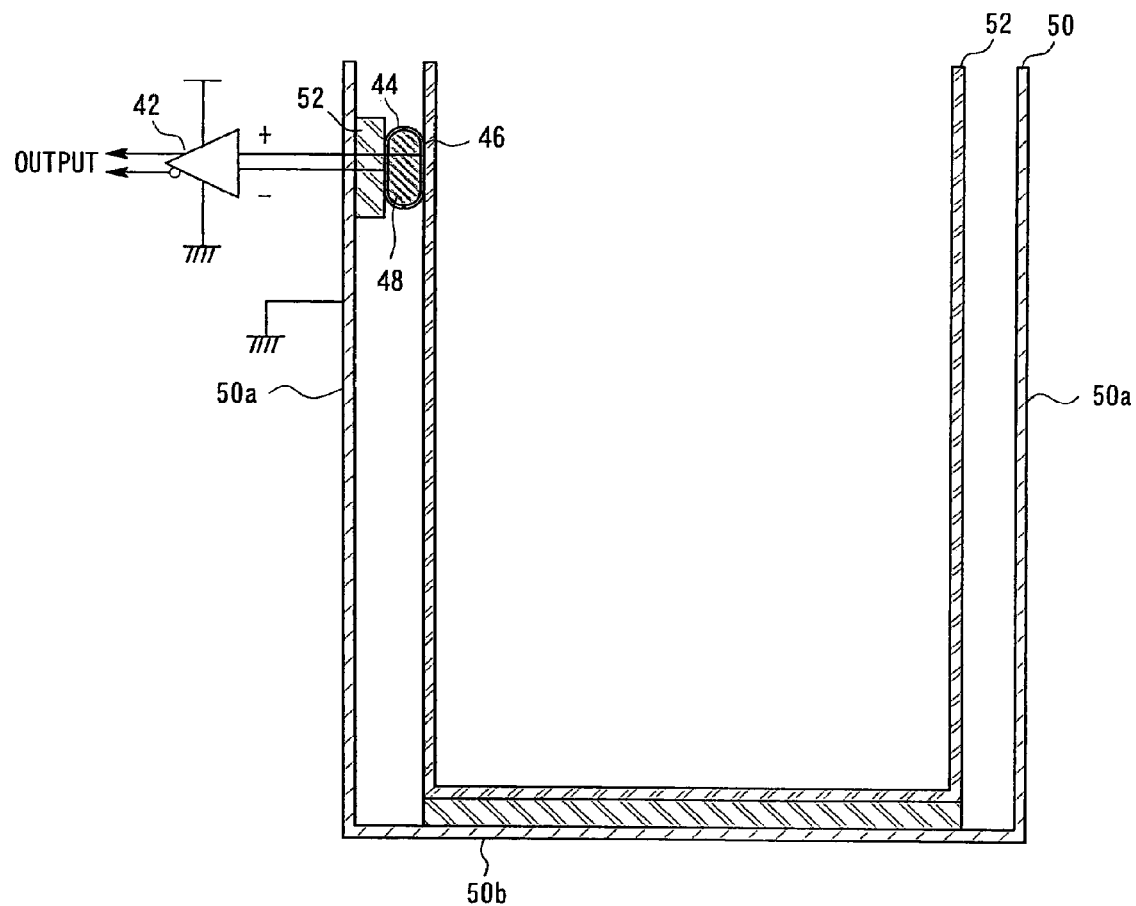
FIG. 12 is a diagram showing an example placement of a receiver in a preferred embodiment of the present invention.

Alternatively, the environment-side electrode 44, living body-side electrode 46, and grounding electrode 50 may be placed in a manner as shown in FIG. 12. FIG. 12 is a cross sectional diagram cutting the gate perpendicularly with respect to the direction of the passageway (direction perpendicular to the plane of the drawing). In this case, the living body-side electrode 46 and the environment-side electrode 44 are placed on a side surface of the passageway of the ticket barrier covered with the insulating member 52, with the living body-side electrode 46 placed at a position nearer to the passageway and the environment-side electrode 44 placed at a position distanced from the passageway compared to the living body-side electrode 46. The dielectric layer 48 is sandwiched between the living body-side electrode 46 and the environment-side electrode 44. The grounding electrode 50 is provided in the gate covered with the insulating member 52, along the passageway. The grounding electrode 50 has a side surface section 50*a* which extends in the vertical direction along the side wall section of the passageway of the gate from the environment-side electrode 44 with the insulating member 52 therebetween. In addition, the grounding electrode 50 may be provided so that a bottom surface section 50*b* extends.

In such a configuration of the communication system, when the user carrying the transmitter 200 passes through the passageway of the gate, the user places a part of the body such as a hand close to the living body-side electrode 46 of the receiver 202 so that communication is enabled between the transmitter 200 and the receiver 202.

Figure 13:
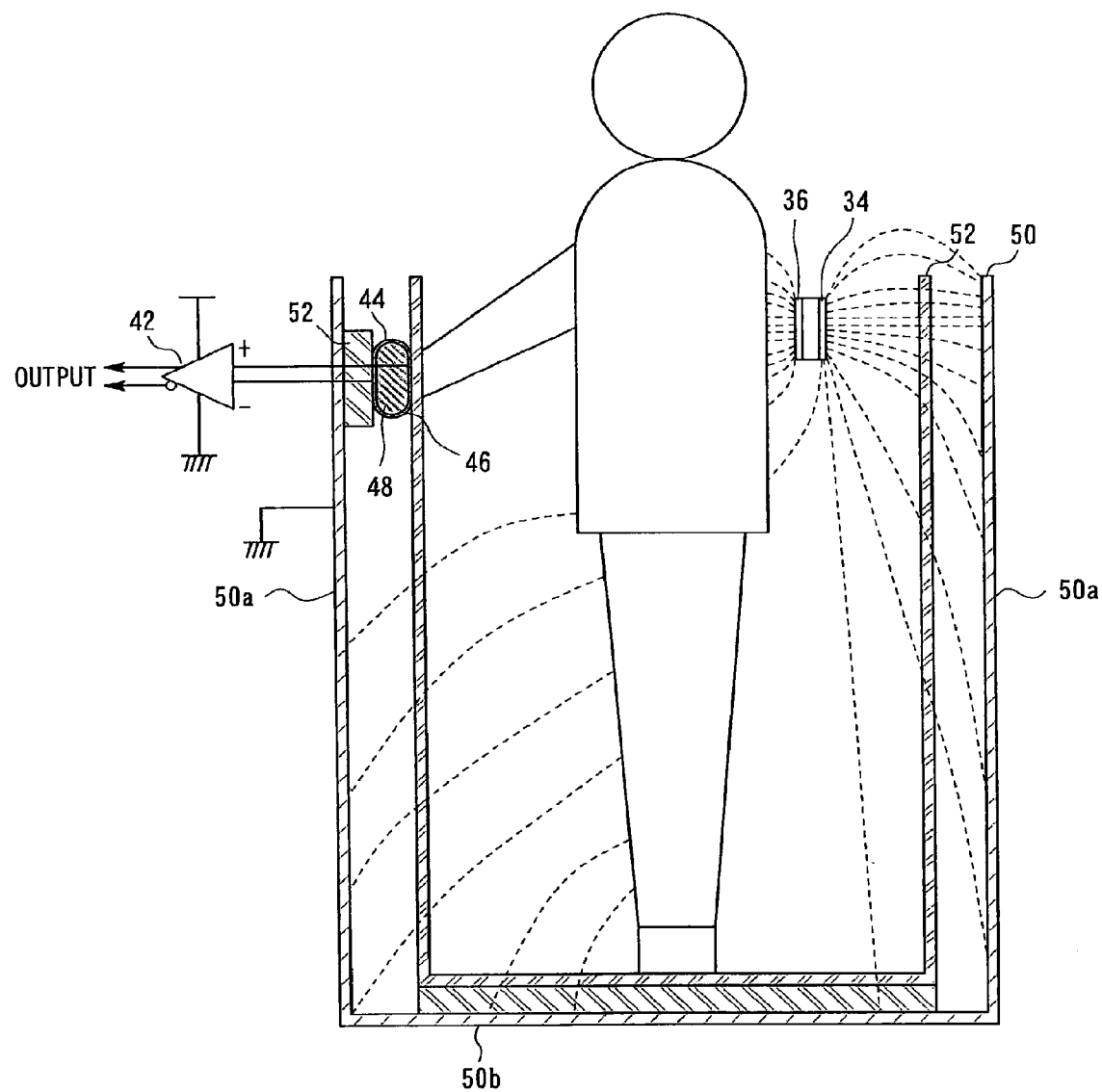
FIG. 13 is a diagram showing an example of formation of an electric field when a communication system is used in the example placement of FIG. 12.

For example, as shown in FIG. 13, when the user carrying the transmitter 200 passes through the gate, the living body-side electrode 36 of the transmitter 200 primarily forms the capacitive coupling C with the body of the user. Similarly, the environment-side electrode 34 of the transmitter 200 primarily forms the capacitive coupling D with the grounding electrode 50. In other words, the electric flux line generated from the environment-side electrode 34 primarily ends at the grounding electrode 50. Moreover, the living body-side electrode 46 of the receiver 202 primarily forms the capacitive coupling F with the hand held by the user. In other words, the electric flux line generated from the living body-side electrode 46 primarily ends at the hand of the user.

As described, with the configuration of FIG. 12 also, most of the electric field from the environment-side electrode 34 ends at the grounding electrode 50. Therefore, the capacitor of the capacitive coupling D formed between the environment-side electrode 34 of the transmitter 200 and the external environment is stabilized when the user passes through the gate regardless of the form and position of carriage, such as the user holding the transmitter 200 in their hand, the transmitter 200 being placed in a pocket of clothing, the transmitter 200 being placed in a bag, etc. As a result, a change of the electric field corresponding to the communication data which is output from the living body-side electrode 36 of the transmitter 200 can be reliably received by the receiver 202.

Figure 14:
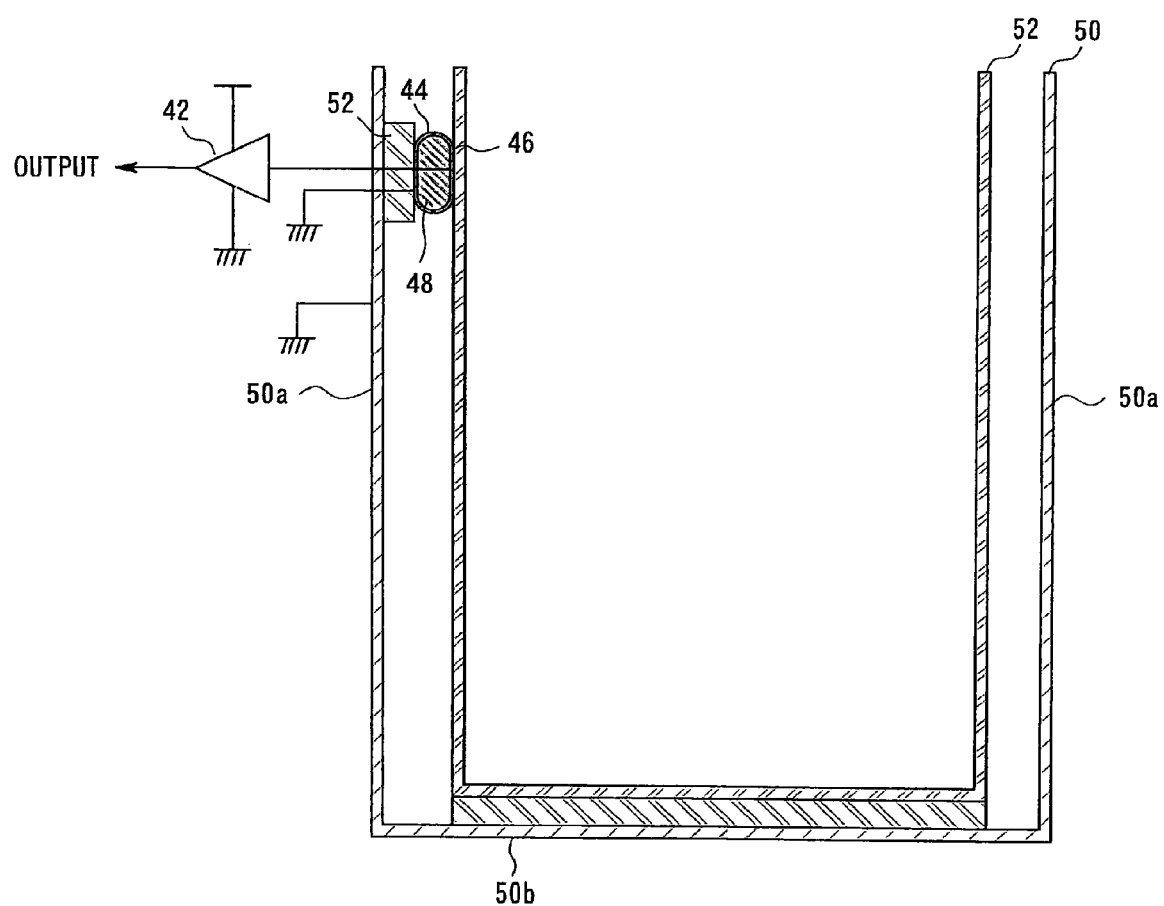
FIG. 14 is a diagram showing an example placement of a receiver in a preferred embodiment of the present invention.

FIG. 14 shows an example configuration where the receiver 202 comprising the reception amplifier 42 having a single amplifier circuit is applied. With such a structure also, advantages similar to those of the structure of the gate shown in FIG. 12 can be obtained.

Figure 15:
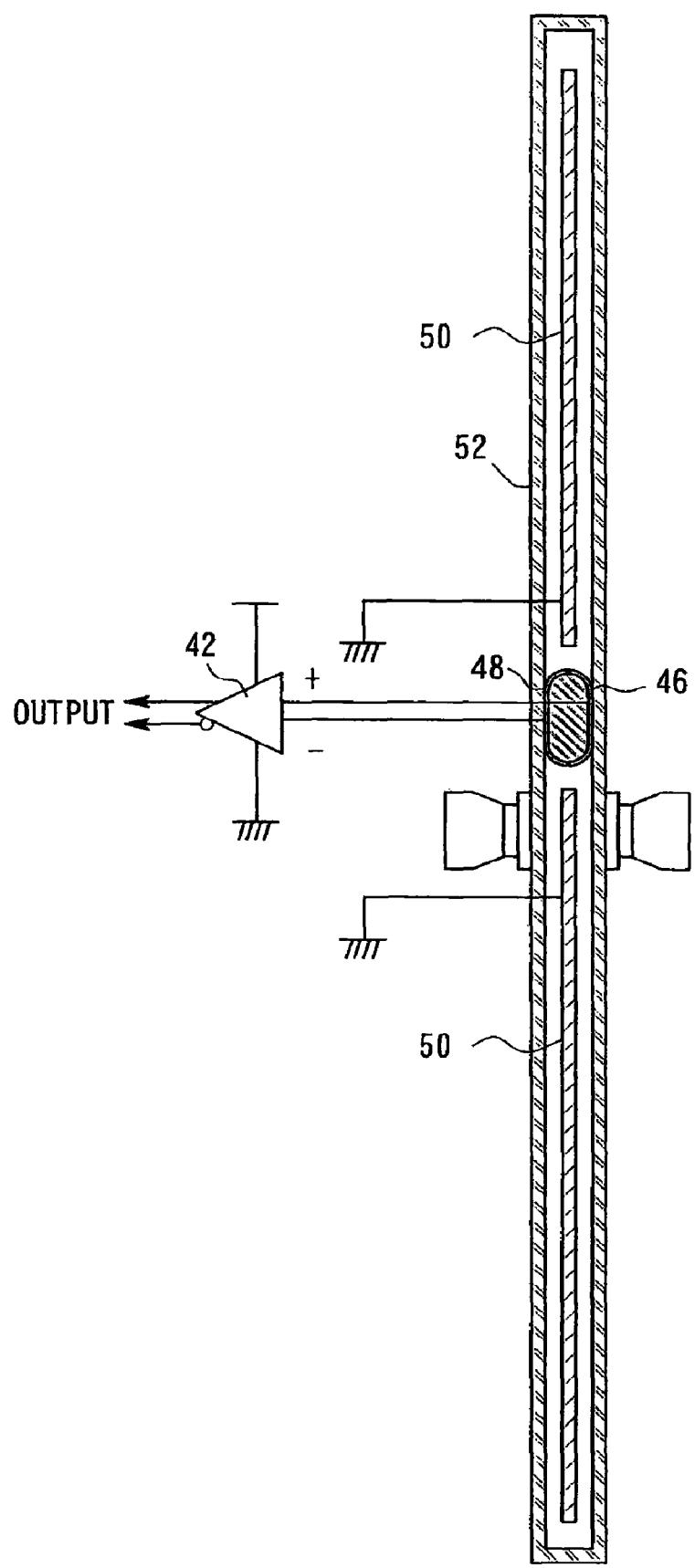
FIG. 15 is a diagram showing an example placement of a receiver in a preferred embodiment of the present invention.

When the communication system is used for opening and closing a door, it is preferable to place the environment-side electrode 44, living body-side electrode 46, and grounding electrode 50 in a manner as shown in FIG. 15. FIG. 15 is a cross sectional diagram in a thickness direction of the door. In this case, a door body 60 is formed with an insulating member, and the living body-side electrode 46 and the environment-side electrode 44 are placed inside the door body 60 near a door knob 62. The dielectric layer 48 is sandwiched between the living body-side electrode 46 and the environment-side electrode 44. The grounding electrode 50 is provided inside the door body 60 in an insulated state from the living body-side electrode 46.

In the structure described above, it is preferable that the grounding electrode 50 extend to a height where there is a possibility that the user may carry the transmitter 200. Normally, when the user carries the transmitter 200, the transmitter 200 is positioned in many cases at a height from the foot to the shoulder. Therefore, the grounding electrode 50 preferably extends to an average height of the shoulder of user in the usage environment of the communication system.

Figure 16:
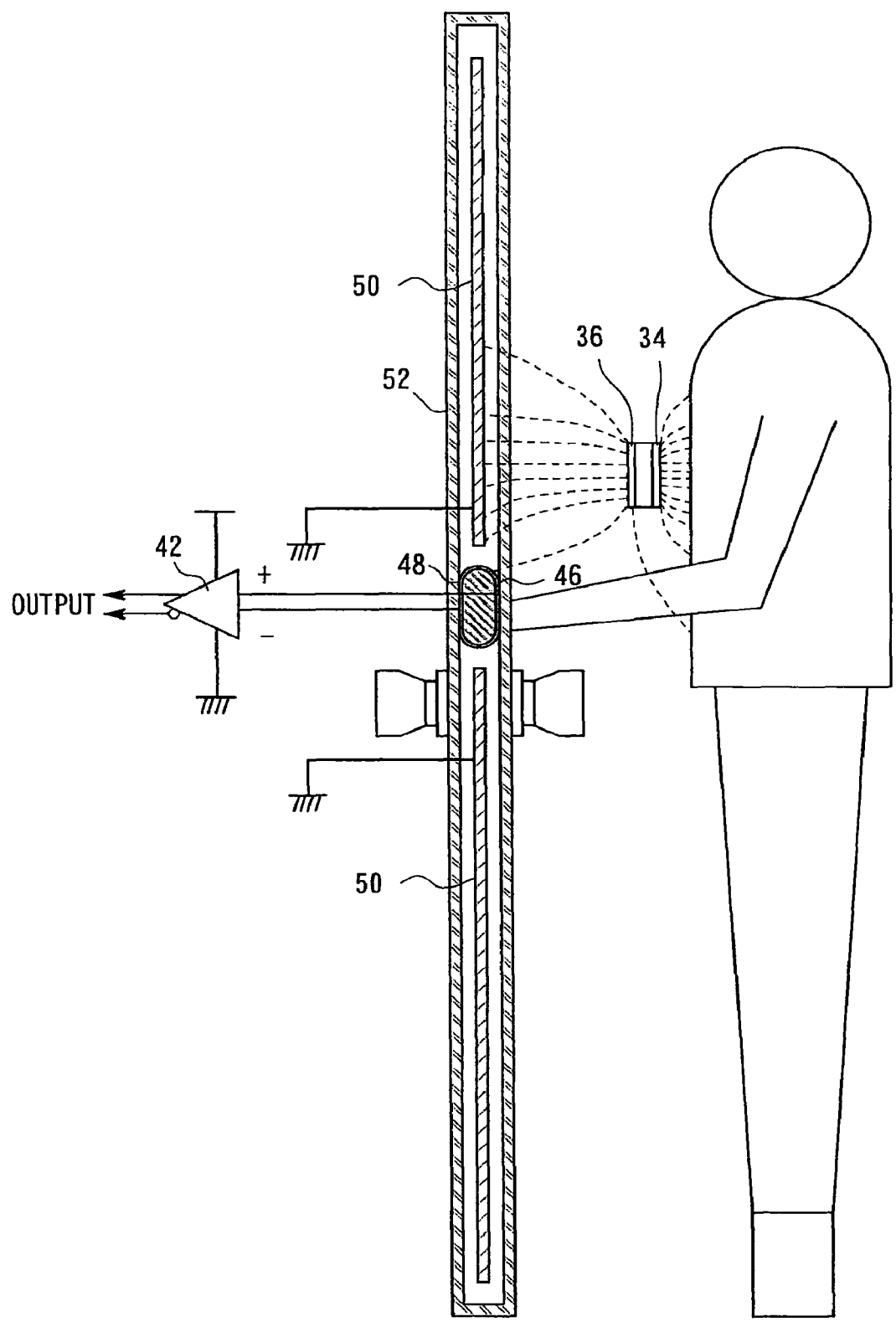
FIG. 16 is a diagram showing an example of formation of an electric field when a communication system is used in the example placement of FIG. 15.

For example, as shown in FIG. 16, when the user carrying the transmitter 200 opens or closes the door, the living body-side electrode 36 of the transmitter 200 primarily forms the capacitive coupling C with the body of the user. Similarly, the environment-side electrode 34 of the transmitter 200 primarily forms the capacitive coupling D with the grounding electrode 50. In other words, the electric flux line generated from the environment-side electrode 34 primarily ends at the grounding electrode 50. In addition, the living body-side electrode 46 of the receiver 202 primarily forms the capacitive coupling F with the hand held by the user. In other words, the electric flux line generated from the living body-side electrode 46 primarily ends at the hand of the user.

As described, with the structure of FIG. 15 also, most of the electric field from the environment-side electrode 34 ends at the grounding electrode 50. Therefore, the capacitor of the capacitive coupling D formed between the environment-side electrode 34 of the transmitter 200 and the external environment when the user passes through the gate can be stabilized regardless of the form and position of the carriage such as the user holding the transmitter 200 in their hand, the transmitter 200 being placed in the pocket of clothing, the transmitter 200 being placed in a bag, etc. As a result, the change of the electric field corresponding to the communication data which is output from the living body-side electrode 36 of the transmitter 200 can be reliably received by the receiver 202.

Figure 17:
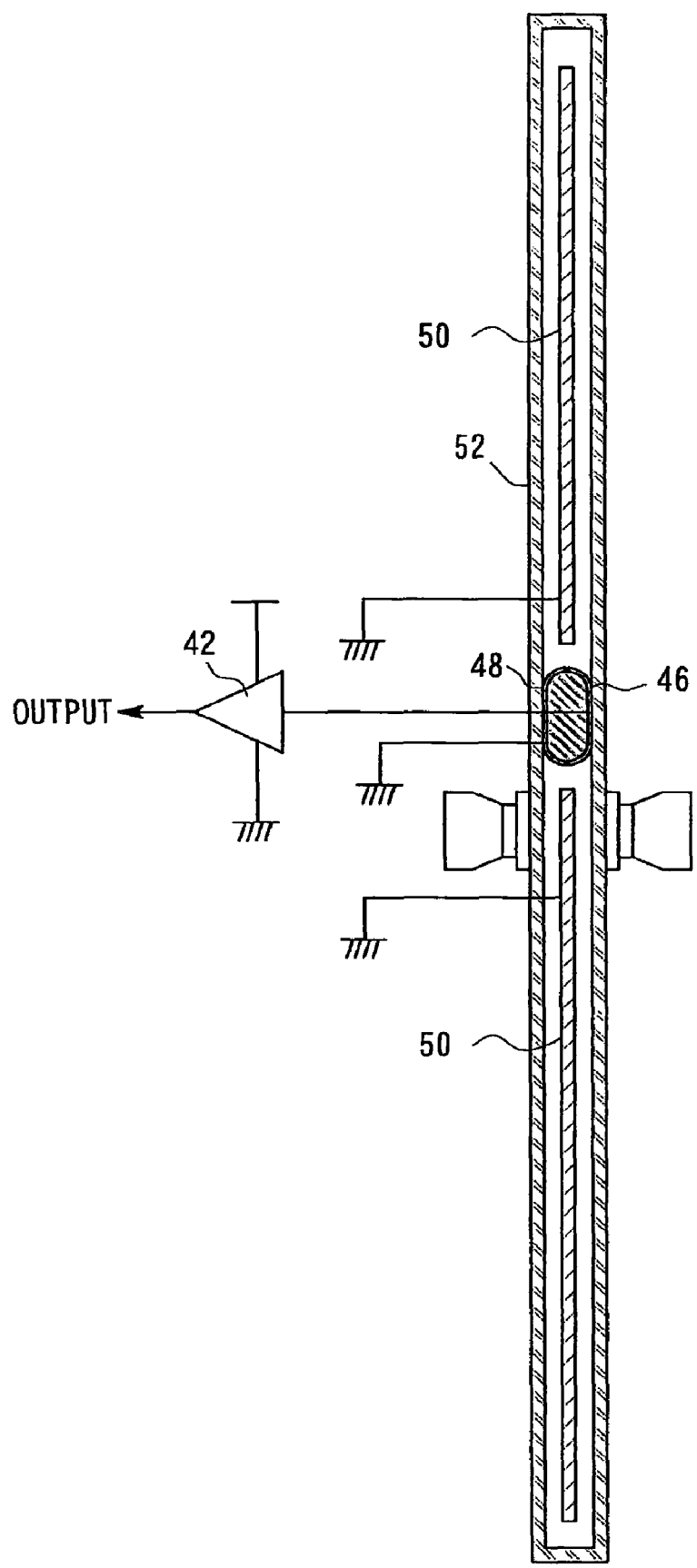
FIG. 17 is a diagram showing an example placement of a receiver in a preferred embodiment of the present invention.

FIG. 17 shows an example configuration where the receiver 202 comprising the reception amplifier 24 having a single amplifier circuit is applied. With such a structure also, advantages similar to those of the structure of the door shown in FIG. 15 can be obtained.

The grounding electrode 50 may have any form as long as at least a part of the electric field from the environment-side electrode 34 of the transmitter 200 ends at the grounding electrode 50. For example, a structure may be employed in which the conductor is machined in a mesh shape. By making the insulating member covering the grounding electrode 50 transparent and forming the grounding electrode 50 in the mesh shape, it is possible to improve the visibility of the gate or door in which the receiver 202 is provided.

Figure 18:
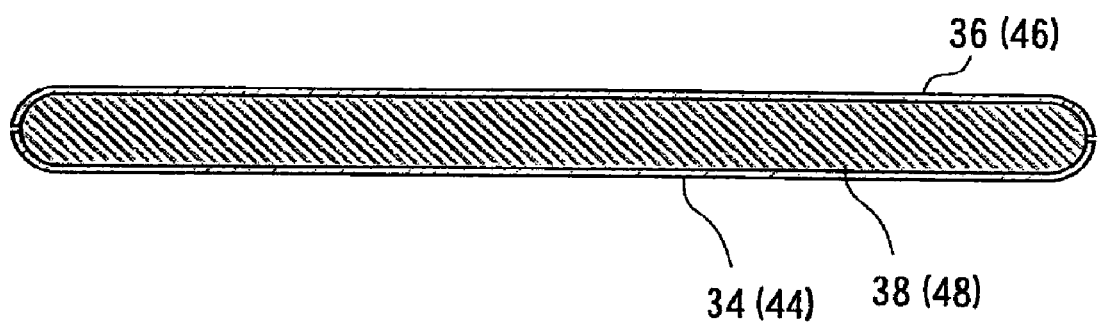
FIG. 18 is a diagram showing an example placement of a dielectric layer, an environment-side electrode, and a living body-side electrode in a preferred embodiment of the present invention.

In addition, as described above, the environment-side electrode 34 and the living body-side electrode 36 of the transmitter 200 and the environment-side electrode 44 and the living body-side electrode 46 of the receiver 202 are placed to sandwich the dielectric layer 38 and the dielectric layer 48, respectively. As shown in FIG. 18, it is preferable that the ends of the electrodes be bent to cover the ends of the dielectric layer 38 and the dielectric layer 48. FIG. 18 is a cross sectional diagram. By machining the ends in this manner, it is possible to reduce concentration of the electric field to the ends of the environment-side electrode 34, living body-side electrode 36, environment-side electrode 44, and living body-side electrode 46, resulting in a more stable communication.

Figure 19:
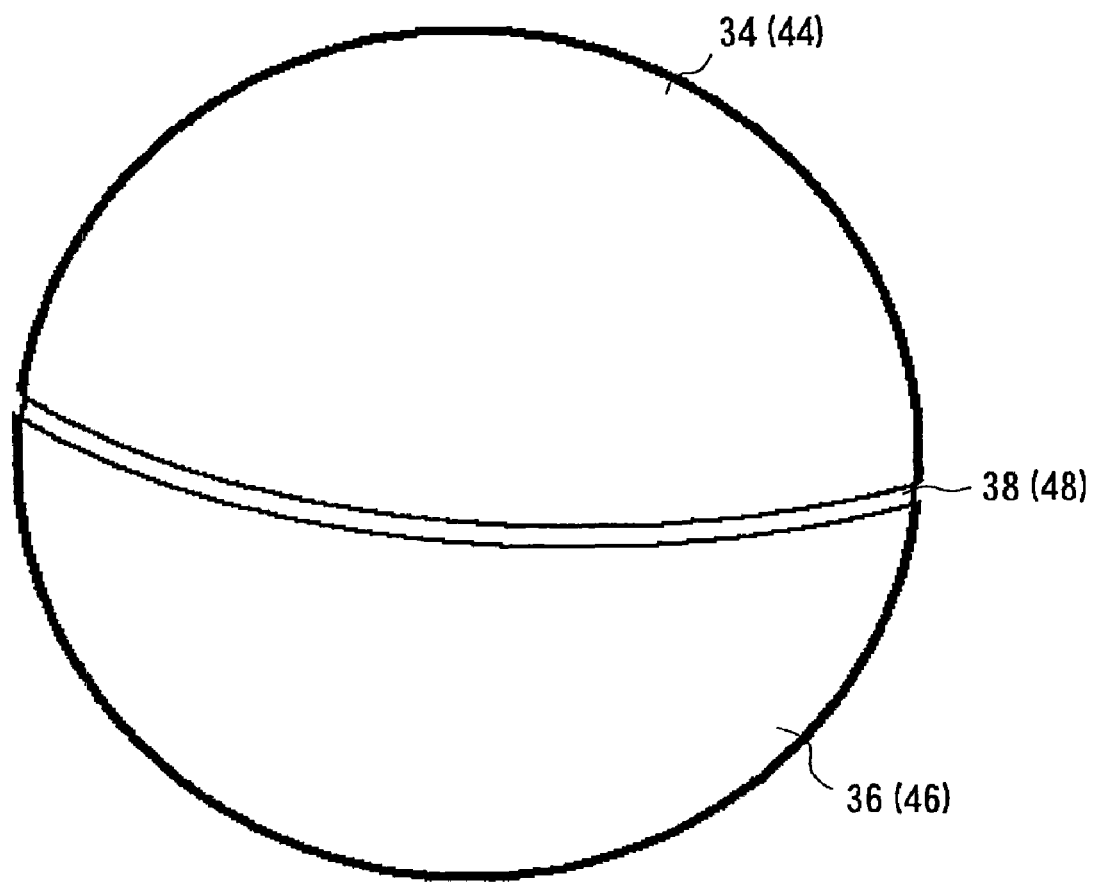
FIG. 19 is a diagram showing an example placement of a dielectric layer, an environment-side electrode, and a living body-side electrode in a preferred embodiment of the present invention.

Alternatively, as shown in FIG. 19, the dielectric layer 38 and the dielectric layer 48 may be formed in a spherical shape and the environment-side electrode 34 and the living body-side electrode 36 of the transmitter 200 and the environment-side electrode 44 and the living body-side electrode 46 of the receiver 202 may be placed covering the periphery of the spheres. When such a configuration is employed also, the concentration of the electric field to the ends of the environment-side electrode 34, living body-side electrode 36, environment-side electrode 44, and living body-side electrode 46 can be reduced, resulting in a more stable communication.

Figure 20:
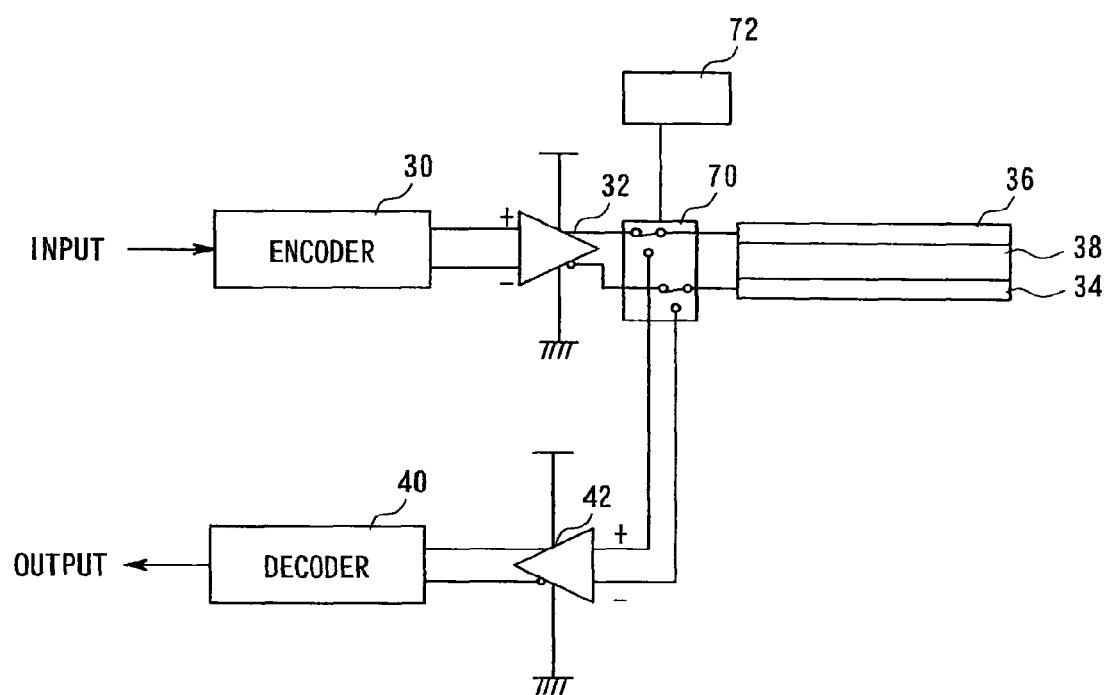
FIG. 20 is a diagram showing a structure of a transceiver in a preferred embodiment of the present invention.

Alternatively, as shown in FIG. 20, a transceiver 204 in which the transmitter 200 and the receiver 202 are combined may be used to allow bidirectional communication. The transceiver 204 comprises the encoder 30, the transmission amplifier 32, the environment-side electrode 34, the living body-side electrode 36, the decoder 40, the reception amplifier 42, a changeover switch 70, and a controller 72.

In the transceiver 204, the environment-side electrode 34 and the living body-side electrode 36 are shared between transmission and reception. The controller 72 switches the changeover switch 70 to the transmission amplifier 32 when data is to be transmitted, and switches the changeover switch 70 to the reception amplifier 42 when data is to be received. The timing of the switching of the changeover switch 70 may be at a predetermined time period or may be achieved by the user.

Figure 21:
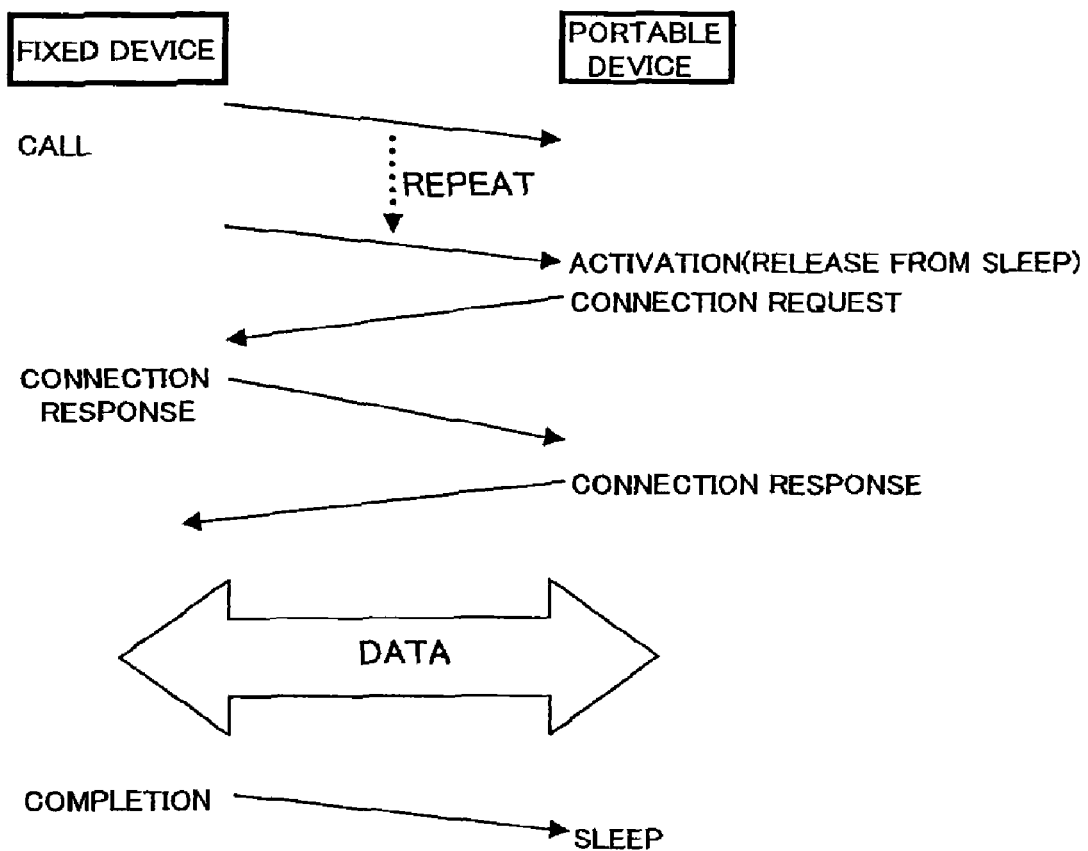
FIG. 21 is a diagram for explaining a communication session using a transceiver of a preferred embodiment of the present invention.
Figure 22A:
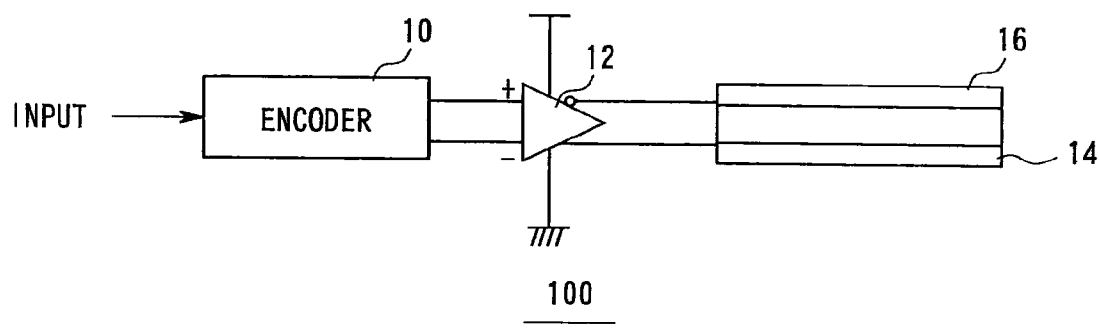
FIG. 22A is a diagram showing a structure of a transmitter in a communication system of related art.
Figure 22B:
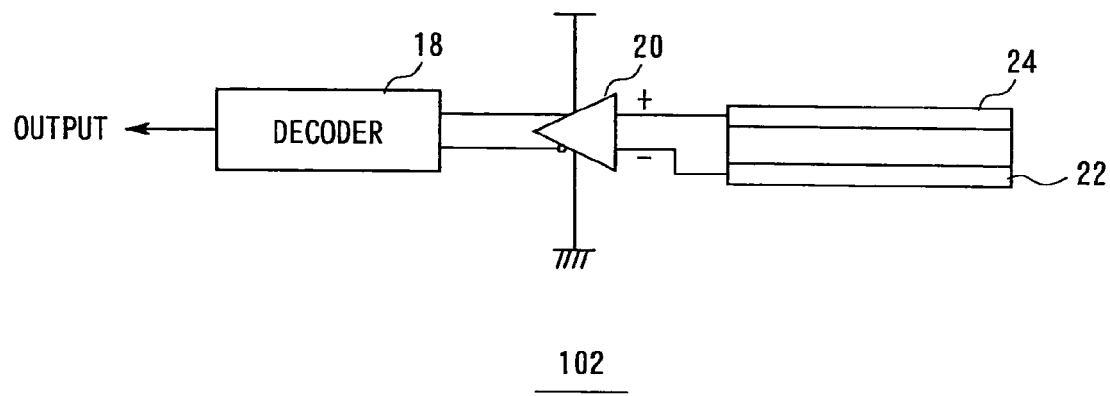
FIG. 22B is a diagram showing a structure of a receiver in a communication system of related art.
Figure 23:
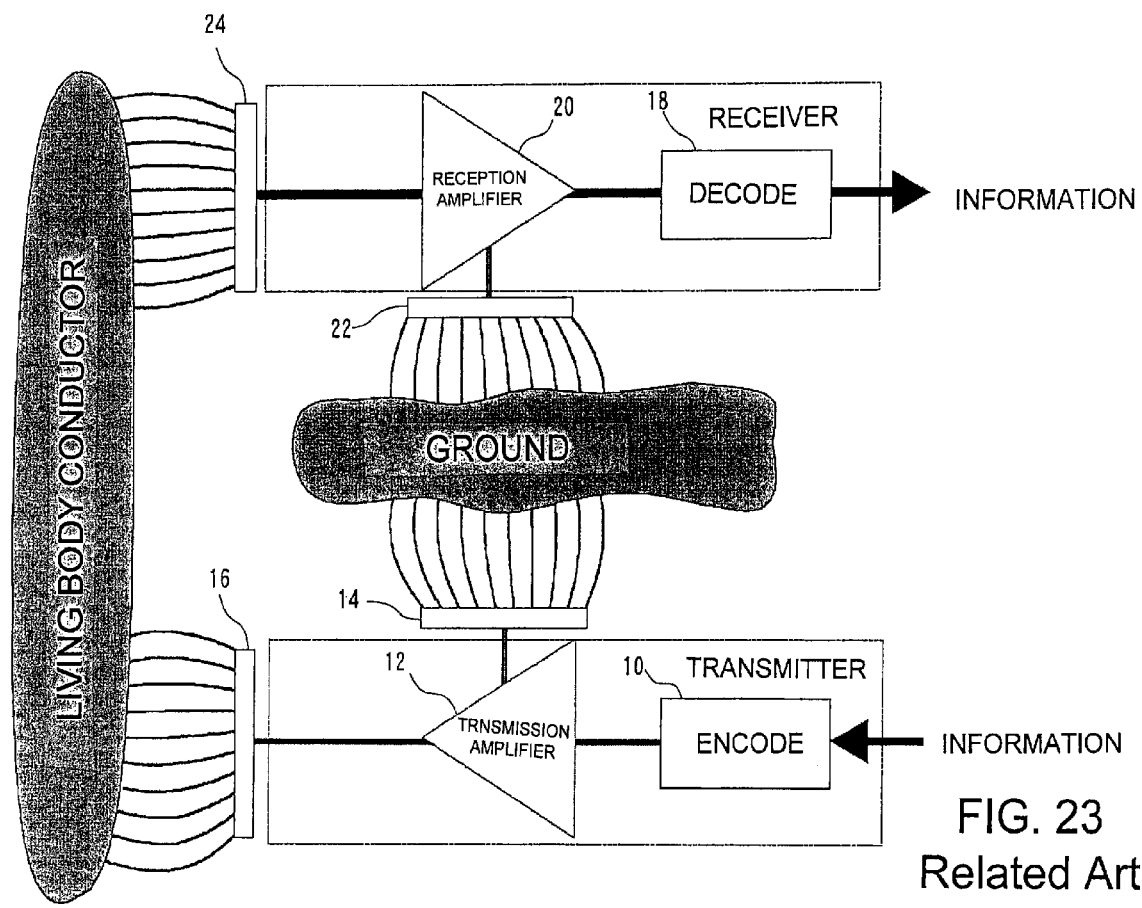
FIG. 23 is a diagram showing an example of formation of an electric field when a communication system is used.
Figure 24:
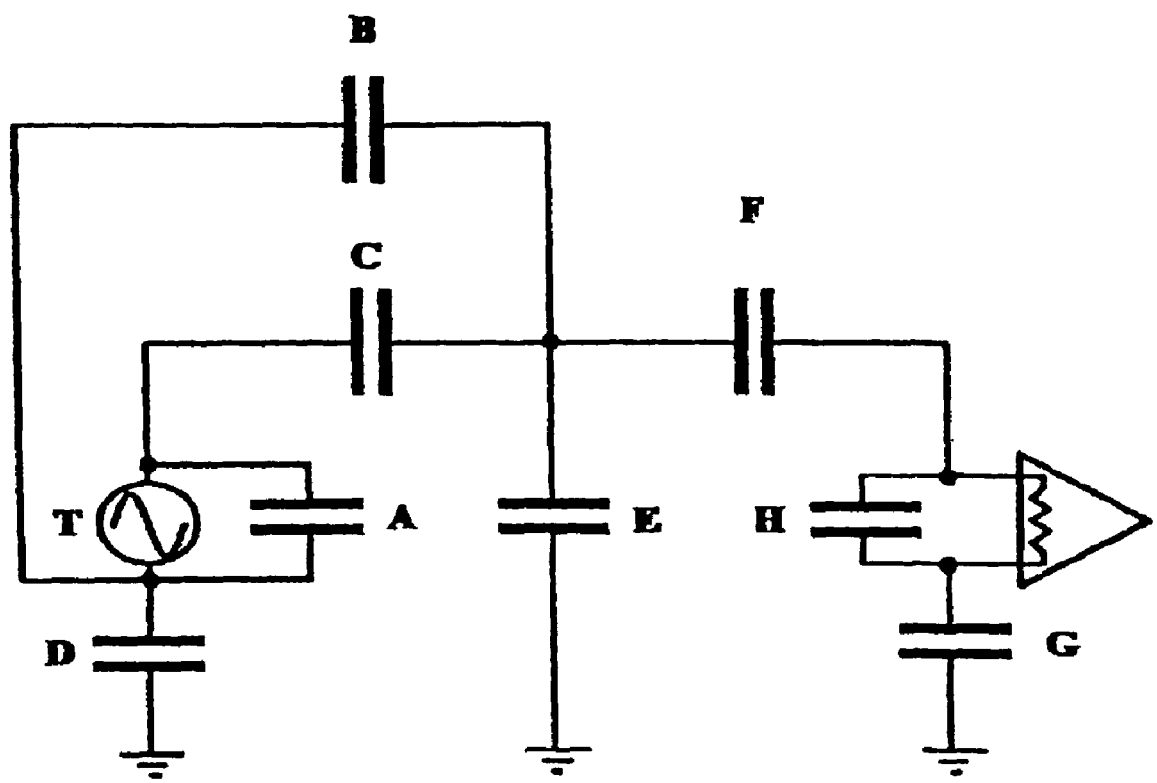
FIG. 24 is a diagram showing an equivalent circuit of a capacitive coupling formed in a communication system.
Figure 25:
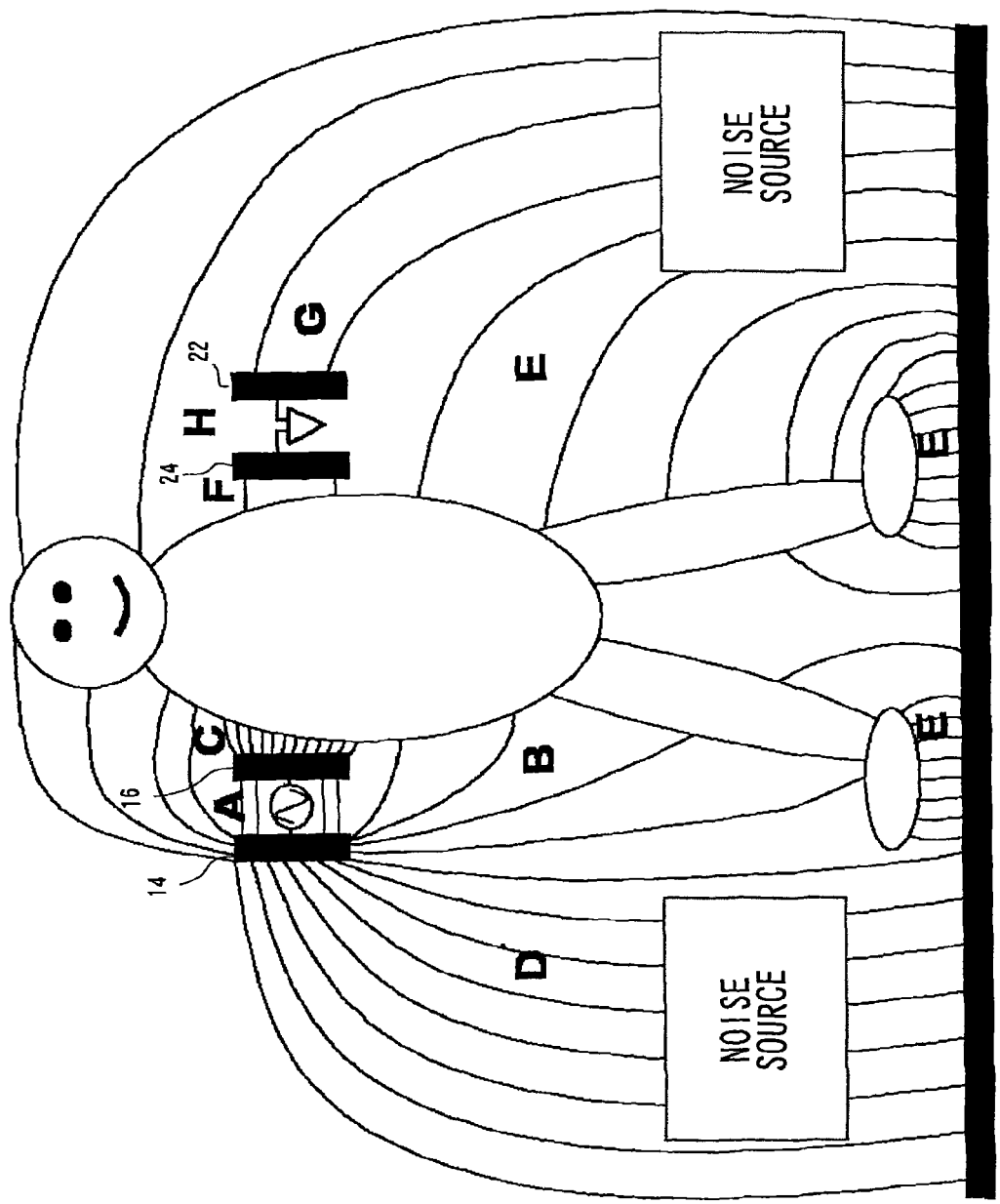
FIG. 25 is a diagram showing an example of formation of an electric field when a communication system is used in a case where a noise source exists.
Figure 26:
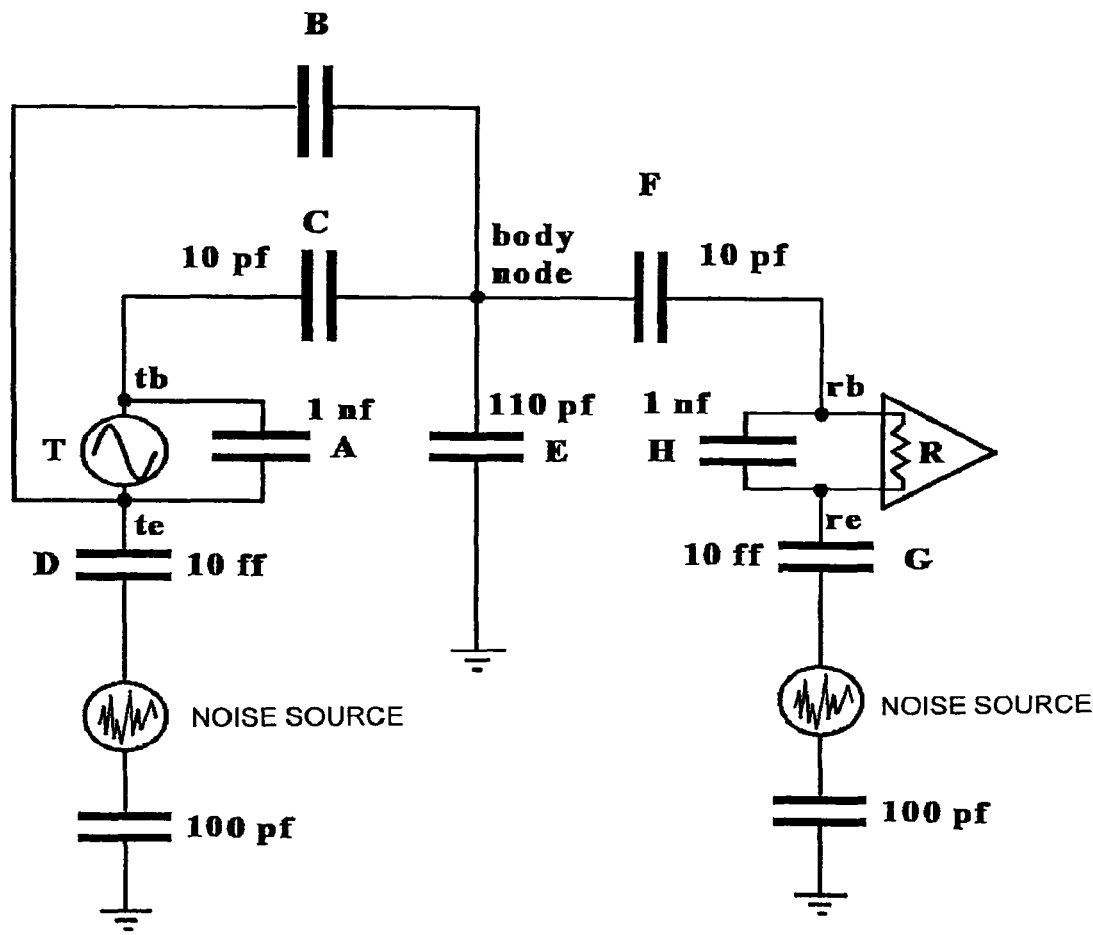
FIG. 26 is a diagram showing an equivalent circuit of a capacitive coupling formed in a communication system when a noise source exists.

For example, as shown in FIG. 21, a communication session can be executed by executing a polling process. In the following description, the transceivers 204 provided in the fixed device and the portable device periodically switch between the transmission state and the reception state at a predetermined period.

The transceiver 204 provided on the fixed device (such as a gate, a door, etc.) repeatedly sends a call to the transceiver 204 provided on the portable device. When there is no transceiver 204 of the portable device in a reception range of the calling signal from the transceiver 204 of the fixed device, the calling is repeated. When, on the other hand, there is the transceiver 204 of the portable device in the reception range of the calling signal from the transceiver 204 of the fixed device, the transceiver 204 of the portable device receiving the calling signal is activated. A connection request signal is transmitted from the activated transceiver 204 of the portable device to the transceiver 204 of the fixed device. When the transceiver 204 of the fixed device receives the connection request signal, the transceiver 204 returns a connection response signal if connection is possible. When the transceiver 204 of the portable device receives the connection response signal, the transceiver 204 returns a connection response signal to the transceiver 204 of the fixed device. When the transceiver 204 of the fixed device receives the connection response signal, the communication session of the data is started. When the data communication is completed, the transceiver 204 of the fixed device transmits a completion signal to the transceiver 204 of the portable device, and the transceiver 204 of the portable device enters a sleep mode.

What is claimed is:

1. A communication system for enabling communication between a transmitter which is portable and a receiver which is fixed, using a capacitive coupling through a living body, wherein
the receiver comprises:
an environment-side electrode and a living body-side electrode sandwiching an insulating layer and electrically insulated from each other;
a grounding electrode electrically connected to the environment-side electrode;
a reception amplifier which amplifies at least a voltage of the living body-side electrode;
a transmission environment-side electrode and a transmission living body-side electrode sandwiching an insulating layer and electrically insulated from each other; and
a transmission amplifier which amplifies a signal and outputs at least to the transmission living body-side electrode;
the transmitter comprises:

a transmission environment-side electrode and a transmission living body-side electrode sandwiching an insulating layer and electrically insulated from each other;

a transmission amplifier which amplifies a signal and outputs to at least the transmission living body-side electrode;

a reception environment-side electrode and a reception living body-side electrode sandwiching an insulating layer and electrically insulated from each other; and a reception amplifier which amplifies at least a voltage of the living body-side electrode; and the grounding electrode has a side surface section which extends along a vertical direction; and polling is executed for the receiver by transmitting a calling signal from the transmitter.

2. The communication system according to claim 1, wherein
the grounding electrode continuously extends from a floor surface along the vertical direction at a location where the receiver is placed.

3. The communication system according to claim 1, wherein
the grounding electrode comprises a bottom surface section which is electrically connected to the side surface section and which is placed on a floor surface at a location where the receiver is placed.

4. The communication system according to claim 1, wherein
at least a part of the grounding electrode has a mesh shape.

5. The communication system according to claim 1, wherein
the grounding electrode extends to a height of 100 cm or higher from a floor surface at a location where the receiver is placed.

6. The communication system according to claim 1, wherein
the reception amplifier comprises a differential amplifier circuit which amplifies and outputs a potential difference between the living body-side electrode and the environment-side electrode.

7. The communication system according to claim 1, wherein
the reception amplifier comprises a single amplifier circuit which amplifies and outputs a voltage of the living body-side electrode with a reference at a potential of the environment-side electrode.

8. The communication system according to claim 1, wherein
the environment-side electrode and the living body-side electrode of the receiver are electromagnetically shielded by the grounding electrode.

9. A receiver for enabling communication with a transmitter which is portable using a capacitive coupling through a living body,
the receiver comprising:
an environment-side electrode and a living body-side electrode sandwiching an insulating layer and electrically insulated from each other;
a grounding electrode which is electrically connected to the environment-side electrode; and
a reception amplifier which amplifies at least a voltage of the living body-side electrode;
a transmission environment-side electrode and a transmission living body-side electrode sandwiching an insulating layer and electrically insulated from each other; and
a transmission amplifier which amplifies a signal and outputs at least to the transmission living body-side electrode;
the transmitter comprising:
a transmission environment-side electrode and a transmission living body-side electrode sandwiching an insulating layer and electrically insulated from each other;
a transmission amplifier which amplifies a signal and outputs to at least the transmission living body-side electrode;
a reception environment-side electrode and a reception living body-side electrode sandwiching an insulating layer and electrically insulated from each other; and
a reception amplifier which amplifies at least a voltage of the living body-side electrode;
wherein the grounding electrode has a side surface section which extends along a vertical direction; and
polling is executed for the receiver by transmitting a calling signal from the transmitter.

* * * * *